US008284835B2

(12) United States Patent
Iguchi

(10) Patent No.: US 8,284,835 B2
(45) Date of Patent: Oct. 9, 2012

(54) MOTION COMPENSATING APPARATUS

(75) Inventor: Masayasu Iguchi, Hyogo (JP)

(73) Assignee: Panasonic Corporation, Osaka (JP)

(*) Notice: Subject to any disclaimer, the term of this patent is extended or adjusted under 35 U.S.C. 154(b) by 1771 days.

(21) Appl. No.: 11/547,143

(22) PCT Filed: Mar. 23, 2005

(86) PCT No.: PCT/JP2005/005264
§ 371 (c)(1),
(2), (4) Date: Oct. 4, 2006

(87) PCT Pub. No.: WO2005/104564
PCT Pub. Date: Nov. 3, 2005

(65) Prior Publication Data
US 2007/0223581 A1   Sep. 27, 2007

(30) Foreign Application Priority Data
Apr. 21, 2004   (JP) ................. 2004-125951

(51) Int. Cl.
H04N 7/12 (2006.01)
H04N 11/02 (2006.01)
H04N 11/04 (2006.01)

(52) U.S. Cl. .......... 375/240.12; 375/240.29; 375/240.21

(58) Field of Classification Search .................. None
See application file for complete search history.

(56) References Cited

U.S. PATENT DOCUMENTS

| 5,387,982 A * | 2/1995 | Kitaura et al. ........... 382/248 |
| 5,809,182 A * | 9/1998 | Ward et al. .............. 382/298 |
| 5,963,675 A * | 10/1999 | van der Wal et al. ..... 382/260 |
| 7,653,132 B2 * | 1/2010 | Dang ................. 375/240.12 |
| 2003/0112864 A1 | 6/2003 | Karczewicz et al. |
| 2004/0213470 A1 * | 10/2004 | Sato et al. ............... 382/239 |

FOREIGN PATENT DOCUMENTS

| EP | 1 406 449 | 4/2004 |
| JP | 6-133297 | 5/1994 |
| JP | 2000069406 A * | 3/2000 |
| JP | 2003-153273 | 5/2003 |
| JP | 2004-7337 | 1/2004 |
| JP | 2004-96757 | 3/2004 |

OTHER PUBLICATIONS

Wiegand, Thomas et al., "Draft ITU-T Recommendation and Final Draft International Standard of Joint Video Specification (ITU-T Rec. H.264 ] ISSO/IEC 14496-10 AVC)", 8th Meeting: Geneva, Switzerland, May 23-27, 2003.

* cited by examiner

Primary Examiner — Joseph Ustaris
Assistant Examiner — Kevin McInnish
(74) Attorney, Agent, or Firm — Wenderoth, Lind & Ponack, L.L.P.

(57) ABSTRACT

Provided is a motion compensating apparatus that efficiently generates a motion-compensated pixel by reducing the amount of data to be transmitted from a multi frame memory storing reference pixel data, while minimizing an increase in the scale of a circuit. A motion compensating apparatus (100) includes: a motion compensation position determining unit (101) that determines, based on a motion vector, a position of pixels for which compensated pixels should be generated; a necessary pixel determining unit (102) that determines pixels necessary for performing 6-tap filtering; a data transfer controlling unit (103) that controls the order or the like of taking out data to be transferred; an intermediate pixel storage memory (105) for storing pixel data with half-pixel accuracy; a high-order tap filtering unit (106) that generates pixel data with half-pixel accuracy by successively performing filtering operations in a predetermined direction; and a linear interpolation calculating unit (107) that performs linear interpolation based on the position of pixels to be motion compensated, and generates and outputs pixel data with motion compensation accuracy of less than half-pixel accuracy.

18 Claims, 21 Drawing Sheets

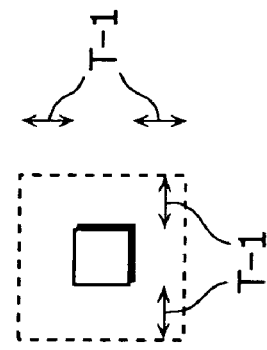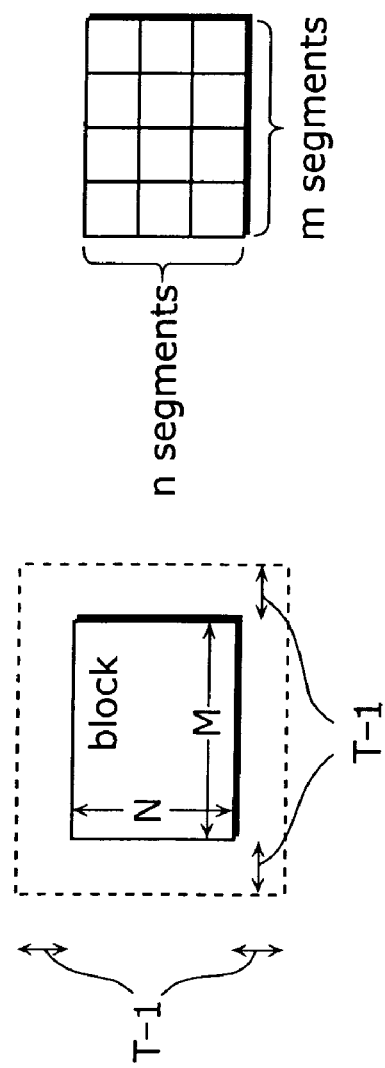

MOTION COMPENSATING APPARATUS

TECHNICAL FIELD

The present invention relates to a motion compensating apparatus that performs motion-compensated prediction with fractional-pixel accuracy between pictures, and particularly to a motion compensating apparatus that generates a motion-compensated image using high-order tap filtering.

BACKGROUND ART

With the advancement of multimedia applications in recent years, it has become common to handle information of various media, such as image, audio, and text, in an integrated form. Such integrated handling of media is possible by digitizing all types of media. However, since an enormous amount of data is contained in digitized images, it is essential to apply information compression technology to the images for their storage and transmission. Meanwhile, the standardization of compression technologies is also important for the interoperability of compressed image data. The global standards for image compression include: H.621 and H.263 of ITU-T (International Telecommunication Union-Telecommunication Standardization Sector); MPEG (Moving Picture Experts Group)-1, MPEG-2, MPEG-4, and the like of ISO/IEC (International Organization for Standardization/International Electrotechnical Commission); and H.264 (MPEG-4AVC), which is under standardization by JVT (Joint Video Team), which is a joint effort between ITU-T and MPEG.

In general, in coding of a moving picture, the amount of information is compressed by reducing redundancies in temporal and spatial directions. Therefore, in inter-picture predictive coding aiming at reducing temporal redundancies, motion estimation and generation of a predictive image are carried out on a block-by-block basis with reference to forward or backward picture(s), and coding is then performed on the difference value between the obtained predictive image and an image in the current picture to be coded. Here, "picture" is a term denoting one image. In the case of a progressive image, a picture means a frame, whereas it means a frame or fields in the case of an interlaced image. Here, "interlaced image" is an image of a frame composed of two fields which are separated in capture time. In coding and decoding of an interlaced image, it is possible to handle one frame as a frame as it is, as two fields, or in a frame structure or a field structure on a per-block basis within the frame.

A picture to be coded using intra picture prediction without reference to any reference images shall be referred to as an I picture. A picture to be coded using inter-picture prediction with reference to only one reference image shall be referred to as a P picture. A picture to be coded using inter-picture prediction with reference to two reference images at the same time shall be referred to as a B picture. It is possible for a B picture to refer to two pictures which can be arbitrarily combined from forward/backward pictures in display time. Reference images (reference pictures) can be designated for each macroblock serving as a basic unit of coding. Distinction shall be made between such reference pictures by calling a reference picture to be described earlier in a coded bitstream a first reference picture, and by calling a reference picture to be described later in the bitstream a second reference picture. Note that as a condition for coding these types of pictures, pictures used for reference need to be already coded.

P pictures and B pictures are coded using motion-compensated inter-picture predictive coding. Motion-compensated inter-picture predictive coding is a coding scheme that employs motion compensation in inter-picture predictive coding. Unlike a technique to perform prediction simply based on pixel values in a reference picture, motion compensation is a technique capable of improving prediction accuracy as well as reducing the amount of data by estimating the amount of motion (hereinafter referred to as "motion vector") of each part within a picture and further by performing prediction in consideration of such amount of motion. For example, it is possible to reduce the amount of data by estimating motion vectors of the current picture to be coded and then by coding prediction residuals between the current picture to be coded and prediction values obtained by making a shift by the amount equivalent to the respective motion vectors. In this scheme, motion vectors are also recorded or transmitted in coded form, since motion vector information is required at the time of decoding.

A motion vector is estimated on a macroblock basis. More specifically, a macroblock in the current picture to be coded shall be previously fixed, and a motion vector is estimated by shifting a macroblock within the search area in a reference picture so as to find the position of a reference block which is most similar to such fixed block in the picture to be coded.

FIG. 1 is a block diagram showing the structure of a conventional inter-picture predictive coding apparatus.

This inter-picture predictive coding apparatus is comprised of a motion estimating unit 401, a multi frame memory 402, a subtracting unit 404, a motion compensating unit 405, a coding unit 406, an adding unit 407, a motion vector memory 408, and a motion vector predicting unit 409.

The motion estimating unit 401 compares each of motion estimation reference pixels MEpel outputted from the multi frame memory 402 with an image signal Vin, and outputs a motion vector MV and a reference picture number RefNo. The reference picture number RefNo is an identification signal that identifies a reference image, selected from among plural reference images, to be referred to by the current image. The motion vector MV is outputted to the motion vector predicting unit 409 as a neighboring motion vector PrevMV, after temporarily stored in the motion vector memory 408. The motion vector predicting unit 409 predicts a predictive motion vector PredMV with reference to such inputted neighboring motion vector PrevMV. The subtracting unit 404 subtracts the predictive motion vector PredMV from the motion vector MV, and outputs the resulting difference as a motion vector prediction difference DifMV.

Meanwhile, the multi frame memory 402 outputs, as motion compensation reference pixels MCpel1, pixels indicated by the reference picture number RefNo and the motion vector MV. The motion compensating unit 405 generates reference pixels with fractional-pixel accuracy, and outputs them as reference image pixels MCpel2. The subtracting unit 403 subtracts the reference image pixels MCpel2 from the image signal Vin, and outputs the resultant as an image prediction error DifPel.

The coding unit 406 performs variable length coding on each image prediction error DifPel, motion vector prediction difference DifMV, reference picture number RefNo, and outputs a coded signal Str. Note that a decoded image prediction error RecDifPel, which is the result of decoding the image prediction error, is outputted at the same time at the time of coding. The decoded image prediction error RecDifPel is obtained by superimposing a coded error onto the image prediction error DifPel, and matches an inter-picture prediction error obtained by an inter-picture predictive decoding apparatus decoding the coded signal Str.

The adding unit 407 adds the decoded image prediction error RecDifPel to the reference image pixels MCpel2, and the resultant is stored into the multi frame memory 402 as a decoded image RecPel. However, in order to make an effective use of the capacity of the multi frame memory 402, an area for an image stored in the multi frame memory 402 is released when such area is not necessary, and a decoded image RecPel of an image that is not necessary to be stored in the multi frame memory 402 is not stored into the multi frame memory 402. Note that coding is performed in units called macroblocks, each containing 16×16 pixels. In motion compensation according to H.264, an appropriate block size is selected for use with coding on a macroblock basis from among seven block sizes intended for motion compensation: 4×4, 4×8, 8×4, 8×8, 8×16, 16×8, and 16×16.

FIG. 2 is a block diagram showing the structure of a conventional inter-picture predictive decoding apparatus. In this diagram, the same elements as those of the inter-picture predictive coding apparatus shown in FIG. 1 are assigned the same reference numbers, and the descriptions thereof are not given here.

The conventional inter-picture predictive decoding apparatus shown in FIG. 2, which is an apparatus that decodes the coded signal Str coded by the conventional inter-picture predictive coding apparatus shown in FIG. 1, and outputs a decoded image signal Vout, is comprised of a multi frame memory 402, a motion compensating unit 405, an adding unit 407, an adding unit 501, a motion vector memory 408, a motion vector predicting unit 409, and a decoding unit 502.

The decoding unit 502 decodes the coded signal Str, so as to output each decoded image prediction error RecDifPel, motion vector prediction difference DifMV, and reference picture number RefNo. The adding unit 501 adds a predictive motion vector PredMV to a motion vector prediction error DifMV, so as to decode a motion vector MV.

The multi frame memory 402 outputs, as motion compensation reference pixels MCpel1, pixels indicated by each reference picture number RefNo and motion vector MV. The motion compensating unit 405 generates reference pixels with fractional-pixel accuracy, and outputs them as reference image pixels MCpel2. The adding unit 407 adds the decoded image prediction error RecDifPel to the reference image pixels MCpel2, and stores the resultant into the multi frame memory 402 as a decoded image RecPel. However, in order to make an effective use of the capacity of the multi frame memory 402, an area for an image stored in the multi frame memory 402 is released when such area is not necessary, and a decoded image RecPel of an image that is not necessary to be stored in the multi frame memory 402 is not stored into the multi frame memory 402. The decoded image signal Vout, that is, decoded images RecPel, is correctly decoded from the coded signal Str.

Meanwhile, the H.264 standard allows motion compensation with up to quarter-pixel accuracy (MPEG-4 Simple Profile allows motion compensation with up to half-pixel accuracy). In this case, the H.264 standard employs 6-tap filtering as a method of linear filter pixel interpolation, specifying that a half pixel is determined from its six neighboring pixels. Referring to FIG. 3, the pixel interpolation method using 6-tap filtering is described.

FIG. 3 is a schematic diagram for illustrating a method according to H.264 of performing pixel interpolation between luminous components. Each of the pixels F00, F01, F02, F03, F04, F05, F10, F11, F12, F13, F14, F15, F20, F21, F22, F23, F24, F25, F30, F31, F32, F33, F34, F35, F40, F41, F42, F43, F44, F45, F50, F51, F52, F53, F54, and F55, is a pixel at an integer-pixel position, and is represented by a diagonally shaded square. Here, each of A, B, C, D, E, F, G, H, I, J, K, L, M, N, P, Q, R, S, T, and U, indicates a position and its pixel value. Each of the pixels at fractional-pixel positions is represented by a hollow square. Each of the pixels aa, bb, cc, dd, ee, ff, gg, and hh, is an intermediate calculation pixel value, before a bit shift is performed, which is multiplied with a coefficient of a 6-tap filter as well as the position of such value. Each of a, b, c, d, e, f, g, h, i, j, k, m, n, p, q, r, and s, represents a pixel value and its position resulted by performing 6-tap filtering and performing linear interpolation at each of the fractional-pixel positions. The following describes a method of calculating the pixel value at each of the fractional-pixel positions a, b, c, d, e, f, g, h, i, j, k, n, p, q, and r. Here, each of b1, h1, s1, and m1 indicates an intermediate calculation pixel value, before a bit shift is performed, which is multiplied with a 6-tap filter coefficient for determining each of the pixel values at b, h, s, and m.

In the case of calculating the pixel value of a half pixel b, 6-tap filtering represented by Equation 1 is performed using six neighboring integer pixels E, F, G, H, I, and J in the horizontal direction, so as to determine an intermediate calculation pixel value b1. Then, a bit shift represented by Equation 2 is performed to carry out a division with half-adjust with integer accuracy as well as a round-off for making the pixel level within a valid range, so as to determine the pixel value at the position b reached by making a half-pixel shift in the horizontal direction.

$$b1=(E-5\times F+20\times G+20\times H-5\times I+J) \quad (1)$$

$$b=\text{Clip}(b1+16)>>5) \quad (2)$$

Here, Clip function, which denotes a round-off, is a function for limiting the value of an output result to fall within the range of values between 0 to 255, by correcting a value less than 0 to 0 and correcting a value greater than 255 to 255. The following description simply refers to the process of a Clip function as a round-off.

In the case of calculating the pixel value of a half pixel h, 6-tap filtering represented by Equation 3 is performed in the similar manner using six neighboring integer pixels A, C, G, M, R, and T in the vertical direction, so as to determine an intermediate calculation pixel value h1. Then, a bit shift and a round-off represented by Equation 4 is performed so as to determine the pixel value at the half-pixel position h reached by making a shift in the vertical direction.

$$h1=(A-5\times C+20\times G+20\times M-5\times R+T) \quad (3)$$

$$h=\text{Clip}((h1+16)>>5) \quad (4)$$

In the case of calculating the pixel value of a half pixel j, an intermediate calculation pixel value j1 is determined either by performing tap filtering represented by Equation 5 using six intermediate calculation pixel values s1, aa, bb, gg, and hh calculated in the same manner as the one in which the intermediate calculation pixel value b1 is calculated or by performing 6-tap filtering represented by Equation 6 using six pixels, m1, cc, dd, ee, and ff calculated in the same manner as the one in which the intermediate calculation pixel value h1 is calculated. Then, a bit shift and a round-off represented by Equation 7 is performed so as to determine the pixel value j at the half-pixel position reached by making a shift in each of the horizontal and vertical directions. Here, in order to minimize a round-off error in the value of the pixel value j, intermediate calculation pixel values m1, s1, aa, bb, cc, dd, ee, ff, gg, and hh before a bit shift is performed, are used for the intermediate calculation for determining the intermediate calculation pixel value j1.

$$j1=cc-5\times dd+20\times h1+20\times m1-5\times ee+ff \quad (5)$$

$$j1=aa-5\times bb+20\times b1+20\times s1-5\times gg+hh \quad (6)$$

$$j=\text{Clip}((j1+512)>>10) \quad (7)$$

The pixel values of the respective half-pixels s and m are determined by performing a bit shift and a round-off represented by Equation 8 and Equation 9, respectively, as in the case of the half pixels b and h.

$$s = \text{Clip}((s1+16) \gg 5) \quad (8)$$

$$m = \text{Clip}((m1+16) \gg 5) \quad (9)$$

Finally, the value of each of the quarter-pixels a, c, d, n, f, i, k, q, e, g, p, and r, is calculated by calculating a pixel value obtained by performing a half-adjust of the value to the decimal place, using the integer pixels G, H, M, and N as well as Equation 2, Equation 4, Equation 7, Equation 8, and Equation 9 (Equation 10 to Equation 21).

$$a = (G+b+1) \gg 1 \quad (10)$$

$$c = (H+b+1) \gg 1 \quad (11)$$

$$d = (G+h+1) > 1 \quad (12)$$

$$n = (M+h+1) \gg 1 \quad (13)$$

$$f = (b+j+1) \gg 1 \quad (14)$$

$$i = (h+j+1) \gg 1 \quad (15)$$

$$k = (j+m+1) \gg 1 \quad (16)$$

$$q = (j+s+1) \gg 1 \quad (17)$$

$$e = (b+h+1) \gg 1 \quad (18)$$

$$g = (b+m+1) \gg 1 \quad (19)$$

$$p = (h+s+1) \gg 1 \quad (20)$$

$$r = (m+s+1) \gg 1 \quad (21)$$

FIG. 4 is a circuit diagram showing the structure of the motion compensating unit 405 that generates motion-compensated pixels in the above-described manner in the case where it is constructed using the conventional technology. The motion compensating unit 405 is the same as the one described for the inter-picture predictive coding apparatus shown in FIG. 1 and the inter-picture predictive decoding apparatus shown in FIG. 2. Motion compensation reference pixels MCpel1 are inputted to the motion compensating unit 405 from the multi frame memory 402. The multi frame memory 402 is also the same as the one described for the inter-picture predictive coding apparatus shown in FIG. 1 and the inter-picture predictive decoding apparatus shown in FIG. 2, and therefore the description thereof is not given here.

The motion compensating unit 405 includes: a delay circuit 501; a high-order tap filtering unit 502; a selector/adder 517 that performs signal selection and addition; and a bit shift 518.

The delay circuit 501 obtains motion compensation reference pixels MCpel from the multi frame memory 402, and holds and outputs the respective pieces of image data while delaying the timings. The high-order tap filtering unit 502 obtains the respective pieces of pixel data outputted from the delay circuit 501, performs 6-tap filtering, a bit shift, and a round-off on each of the obtained pixel data, and outputs the resultant. The selector/adder 517 selects pixel values from those inputted from the delay circuit 501 and high-order tap filtering unit 502 according to the position of pixels to be motion compensated, performs an addition where necessary, and outputs the resultant. The bit shift 518 performs a bit shift of the output result from the selector/adder 517 where necessary, according to the position of pixels to be motion compensated, whereas the value is outputted as it is as a reference image pixel MCpel2 when bit shift is not necessary.

The delay circuit 501 obtains six horizontal pixels at the same time and performs a 6-stage delay. Pixel data at each of the integer-pixel positions A, B, C, D, E, F, G, H, I, J, K, L, M, N, P, Q, R, S, T, and U in the schematic diagram of FIG. 3 showing the pixel interpolation method, is accumulated in each of the buffers that make up the delay circuit 501, that is, in a buffer BA, a buffer BB, a buffer BC, a buffer BD, a buffer BE, a buffer BF, a buffer BG, a buffer BH, a buffer BI, a buffer BJ, a buffer BK, a buffer BL, a buffer BM, a buffer BN, a buffer BP, a buffer BQ, a buffer BR, a buffer BS, a buffer BT, and a buffer BU.

The high-order tap filtering unit 502 includes: plural 6-tap filters 503 to 511; and plural bit shifts 512 to 516, each performing a half-adjust of the value after the decimal point as well as a round-off. Each of the 6-tap filter 503, 6-tap filter 504, 6-tap filter 505, 6-tap filter 506, 6-tap filter 507, 6-tap filter 508, 6-tap filter 509, and 6-tap filter 510, receives an output signal from the delay circuit 501, performs a multiplication of a coefficient and an addition, and outputs each of the intermediate calculation pixel values Saa, Sbb, Sb1, Ss1, Sgg, Shh, Sm1, and Sh1. At this time, the intermediate calculation pixel values Sb1 and Sh1 have values obtained by Equation 1 and Equation 3, respectively. The values of the other intermediate calculation pixel values Saa, Sbb, Ss1, Sgg, Shh, and Sm1 are output values from a 6-tap filter which are the same as the ones represented by Equation 1 and Equation 3, and correspond to aa, bb, s1, gg, hh, and m1 in the schematic diagram of FIG. 3 showing the pixel interpolation method.

The 6-tap filter 511 has, as its inputs, the output values Saa, Sbb, Sb1, Ss1, Sgg, Shh, Sm1, and Sh1, which are the results of the 6-tap filters in the horizontal direction, and outputs Sj1 as the result of the 6-tap filter in the vertical direction represented by Equation 6. The bit shift 512, bit shift 513, bit shift 514, bit shift 515, and bit shift 516 have, as their respective inputs, Ss1, Sj1, Sb1, Sm1, and Sh1, perform a bit shift and a round-off, represented by Equation 8, Equation 7, Equation 2, Equation 9, and Equation 4, for performing a half-adjust of the value after the decimal point, and output the respective resultants as Ss, Sj, Sb, Sm, and Sh.

The selector/adder 517 and the bit shift 518 have, as their respective inputs, SN, SM, SH, and SG, which are buffer values from the delay circuit 501, as well as Sb, Ss, Sm, Sh, and Sj, which are output values from the high-order tap filtering unit 502. The selector/adder 517 and the bit shift 518 perform average value calculations with half-adjust represented by Equation 10 to Equation 21 where necessary, according to the position of pixels to be motion compensated, and output motion-compensated pixels MCpel2 with fractional accuracy.

Through the above structure and a series of operations, it is possible to generate a motion-compensated image with quarter-pixel accuracy from motion compensation reference pixels MCpel1 so as to output it as a motion-compensated image MCpel2 with fractional accuracy, and obtains a decoded image signal Vout, that is, decoded images RecPel, correctly from the coded signal Str so as to output it (for example, refer to Non-patent document 1). Non-patent document 1: "Draft ITU-T Recommendation and Final Standard of Join Video Specification" 8.4.2.2, Join Video Team (JVT) of ISO/IEC MPEG & ITU-T VCEG, JVT-G050r1, 27, May 2003

DISCLOSURE OF INVENTION

Problems that Invention is to Solve

However, in processing a luminous signal according to the H.264 standard, in the case where a motion compensating unit is constructed by use of the conventional technology as described above, there is a problem that the width of a bus band used to read out reference pixel data from the multi frame memory 402 becomes wider each time a motion-compensated pixel of one pixel is generated.

In other words, motion compensation according to the H.264 standard shown in FIG. 4 described above, for example, requires 36 neighboring pixels to determine pixels that are half a pixel off in the horizontal and vertical direction, respectively, there is an output of a compensated pixel for one pixel per cycle after repeating data transfer of six pixels for five cycles. In a unit of one block, the above process is repeated by the number of times equal to the number of columns in a block and then 6-tap filtering is performed. Thus, the number of pixels to be transmitted in the case of processing one 16×16 block, which is the largest possible block to be processed in the H.264 standard, and where sixteen 4×4 block, which is the smallest possible block, can be calculated as represented by the following Equation 22 and Equation 23, respectively:

$$(16+5) \times 16 \times 6 \text{ pixel width} \times 1 \text{ block} = 2,016 \quad (22), \text{and}$$

$$(4+5) \times 4 \times 6 \text{ pixel width} \times 16 \text{ block} = 3,456 \quad (23).$$

Meanwhile, in the case of a motion-compensated image that is generated simply through linear interpolation between horizontal 2 pixels and vertical 2 pixels without using any high-order tap filters, the number of pixels to be transmitted in the case of a block sized 16×16 and in the case of a block sized 4×4 can be calculated as represented by the following Equation 24 and Equation 25, respectively:

$$(16+1) \times 16 \times 2 \text{ pixel width} \times 1 \text{ block} = 544 \quad (24), \text{and}$$

$$(4+1) \times 4 \times 2 \text{ pixel width} \times 16 \text{ block} = 640 \quad (25).$$

Thus, it is known from Equation 22 to Equation 25 that, according to the H.264 standard, the number of pixels to be transmitted from the multi frame memory 402, as a reference image of each macroblock (MB) is 3.7 times to 5.4 times as large as the case where an image is generated through linear interpolation between two pixels.

The present invention has been conceived in view of the above problem, and it is an object of the present invention to provide a motion compensating apparatus that efficiently generates a motion-compensated image by reducing the amount of data to be transmitted from a multi frame memory storing reference pixel data, while minimizing an increase in the scale of a circuit.

Means to Solve the Problems

In order to achieve the above object, the motion compensating apparatus according to the present invention is a motion compensating apparatus that performs motion-compensated prediction with fractional-pixel accuracy between pictures that constitute a moving picture, the apparatus including: a high-order tap filtering unit that generates pieces of pixel data with half-pixel accuracy used for motion-compensated prediction, by successively performing filtering operations in a predetermined direction on pieces of reference pixel data to be transferred thereto, the pieces of reference pixel data being included in each block; and an intermediate output pixel storing unit that stores the pieces of pixel data with half-pixel accuracy generated by the high-order tap filtering unit, wherein the high-order tap filtering unit generates pieces of pixel data with half-pixel accuracy by successively performing, on pieces of pixel data with half-pixel accuracy inputted from the intermediate output pixel storing unit, filtering operations in a direction orthogonal to the predetermined direction.

With this structure, it is possible, for example, to reduce the data amount of reference pixel data transferred to the motion compensating apparatus from a multi frame memory storing reference pixel data, by performing, in high-order tap filtering, filtering operations collectively in the horizontal direction or the vertical direction to generate pixels with half-pixel accuracy and to store the resultant of the first filtering into a dedicated intermediate output pixel storing unit as intermediate output pixels, and by utilizing such intermediate output pixels at the time of performing filtering operations in a direction orthogonal to the first direction to generate pixels with half-pixel accuracy.

The motion compensating apparatus may further include: a data transfer controlling unit that controls transfer of the pieces of reference pixel data; and a first pixel selecting unit that selects, based on the control performed by the data transfer controlling unit, the pieces of pixel data with half-pixel accuracy inputted from the intermediate output pixel storing unit or the pieces of reference pixel data, and outputs the selected pieces of data to the high-order tap filtering unit.

Here, the data transfer controlling unit may compare the number of pixels in a horizontal direction and the number of pixels in a vertical direction in the current block to be processed, and transfer, to the high-order tap filtering unit, the pieces of reference pixel data used for the current block to be processed in the direction in which a smaller number of pixels are arranged.

With this structure, a more efficient motion-compensated prediction as well as a reduced implementation area can be achieved, since it is possible to reduce the pixel capacity required by the intermediate output pixel storing unit and to reduce the number of pixels to be transferred in the second filtering.

Furthermore, the data transfer controlling unit may segment the current block to be processed into a predetermined number of sub-blocks, and transfer the pieces of reference pixel data used for the current block to be processed to the high-order tap filtering unit on a sub-block basis.

With this structure, a further reduced implementation area can be achieved, since it is possible to reduce the capacity required by the intermediate output pixel storing unit.

Moreover, the motion compensating apparatus may further include a necessary pixel determining unit that determines a pixel area necessary for processing performed by the high-order tap filtering unit, based on a position of pixels to be motion compensated, wherein the data transfer controlling unit may transfer, to the high-order tap filtering unit, only ones of the pieces of reference pixel data included in the pixel area determined as necessary by the necessary pixel determining unit.

With this structure, a further efficient motion-compensated prediction can be achieved, since it is possible to reduce wasteful transfers by determining whether or not an area is used to perform a filtering operation based on a motion compensation position with fractional accuracy and by performing data transfer selectively at the time of performing a filtering operation.

Furthermore, the high-order tap filtering unit may include: a first high-order tap filtering unit that generates the pieces of pixel-data with half pixel accuracy by successively performing the filtering operations in the predetermined direction on the pieces of reference pixel data, the filtering operations being performed for the number of times that is equivalent to the number of rows or columns in a current block to be processed; and a second high-order tap filtering unit that generates the pieces of pixel data with half-pixel accuracy by successively performing, on the pieces of pixel data with half-pixel accuracy inputted from the intermediate output pixel storing unit or the pieces of reference pixel data, the filtering operations in the direction orthogonal to the direction in which the first high-order tap filtering unit performs the operations, the filtering operations being performed for the number of times that is equivalent to the number of rows or columns in the current block to be processed.

Here, it is preferable that the second high-order tap filtering unit supports a bit accuracy of the pieces of pixel data with half-pixel accuracy.

With this structure, a reduced implementation area can be achieved, since it is possible to selectively assign a filter with high bit accuracy in the case of implementing plural high-tap filter resources. Reduction in an implementation area is possible by, for example, the first high-order tap filtering unit supporting a bit accuracy of up to that of pixel data with integer-pixel accuracy and the second high-order tap filtering unit implementing operation resources that support a bit accuracy of pixel data with half-pixel accuracy, in which case it is not necessary to assign a filter with high bit accuracy to the first high-order tap filtering unit.

Furthermore, the intermediate output pixel storing unit may store the pieces of reference pixel data, together with the pieces of pixel data with half-pixel accuracy generated by the first high-order tap filtering unit, and simultaneously perform data reading and writing, the second high-order tap filtering unit may perform the filtering operations on pieces of reference pixel data and pieces of pixel data with half-pixel accuracy inputted from the intermediate output pixel storing unit, and the first high-order tap filtering unit and the second high-order tap filtering unit may perform the operations in a pipelined manner.

With this structure, a further efficient motion-compensated prediction can be achieve, since it is possible to: reduce the amount of pixels to be transferred, by transferring reference pixel data only at the time of filtering performed in a first direction by increasing the capacity of the intermediate output pixel storing unit; and perform filtering independently on a block in a generation different from data of the current block on which filtering in a second direction is being performed, by causing the intermediate output pixel storing unit to perform a bank operation.

Note that not only it is possible to embody the present invention as the above motion compensating apparatus, but also as a motion compensating method that includes, as its steps, the characteristic units included in such motion compensating apparatus, and as a program that causes a computer to execute such steps. It should be noted that such program can be distributed on a recording medium such as a CD-ROM as well as on a transmission medium such as the Internet.

EFFECTS OF THE INVENTION

As is obvious from the above, the motion compensating apparatus according to the present invention makes it possible to efficiently generate a motion-compensated image by reducing the amount of data to be transmitted from a multi frame memory storing reference pixel data, while minimizing an increase in the scale of a circuit.

BRIEF DESCRIPTION OF DRAWINGS

FIG. 11A shows a unit of a block for which a motion-compensated image is generated, FIG. 11B is a diagram showing block segmentation, and FIG. 11C is a diagram showing an area to be transferred, which is a segmented area added with neighboring pixels that are necessary to perform filtering.

FIG. 17A is a diagram for illustrating an example physical format of a flexible disk as a recording medium itself, FIG. 17B is a diagram for illustrating an external view of the flexible disk viewed from the front, a schematic cross-sectional view, and the flexible disk, and FIG. 17C is a diagram for illustrating a structure for recording and reading out the program on and from the flexible disk FD.

NUMERICAL REFERENCES

Figure 1:
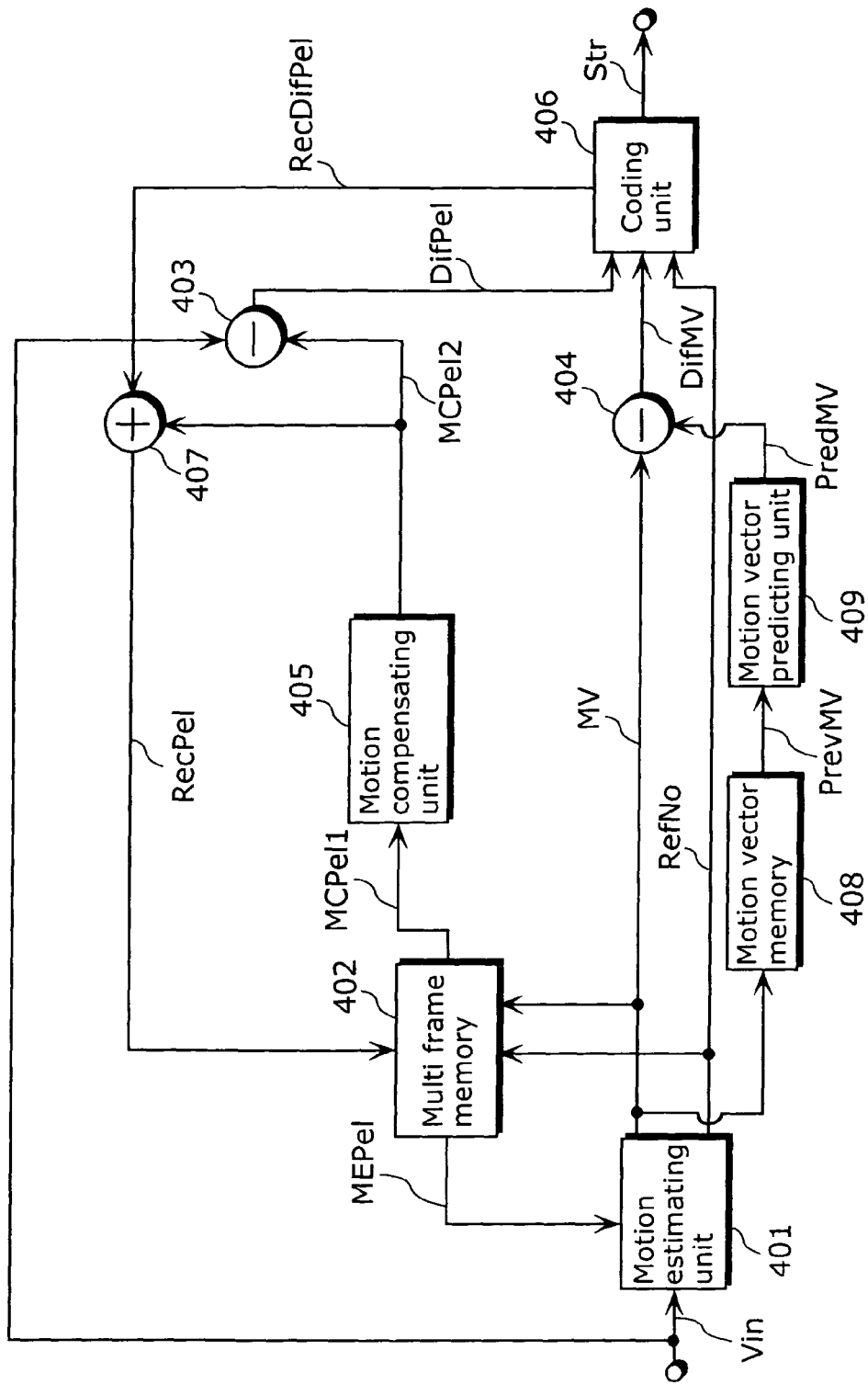
FIG. 1 is a block diagram showing the structure of a conventional inter-picture predictive coding apparatus.

100 Motion compensating apparatus (motion compensating unit)
101 Motion compensation position determining unit
102 Necessary pixel determining unit
103 Data transfer controlling unit
104 Pixel selecting unit
105 Intermediate pixel storage memory
106 High-order tap filtering unit
107 Linear interpolation calculating unit
201, 202 Delay circuit
402 Multi frame memory
503, 511 6-tap filter
205, 512, 513, 514, 518 Bit shift
517 Selector/adder
MCpel1 Multi frame memory output pixel signal
MCpel2 Motion compensated pixel signal with fractional accuracy
MCpel3 Intermediate pixel storage memory output pixel signal
SselAdd Selector/adder output signal
SdatCtr Data transfer control signal SpxlJdg Necessary pixel determination signal
SmcPos Motion compensation position determination signal
Sm1$h$1 Fractional-accuracy pixel signal before bit shift
Smh Fractional-accuracy pixel signal
Sa1 Fractional-accuracy pixel signal before bit shift
Sb1 Fractional-accuracy pixel signal before bit shift
Sj1 Fractional-accuracy pixel signal before bit shift
Ss Fractional-accuracy pixel signal
Sj Fractional-accuracy pixel signal
Sb Fractional-accuracy pixel signal
SMN Integer-accuracy pixel signal
SGN Integer-accuracy pixel signal

BEST MODE FOR CARRYING OUT THE INVENTION

The following describes each of the embodiments of the present invention with reference to the drawings.

(First Embodiment)

Figure 2:
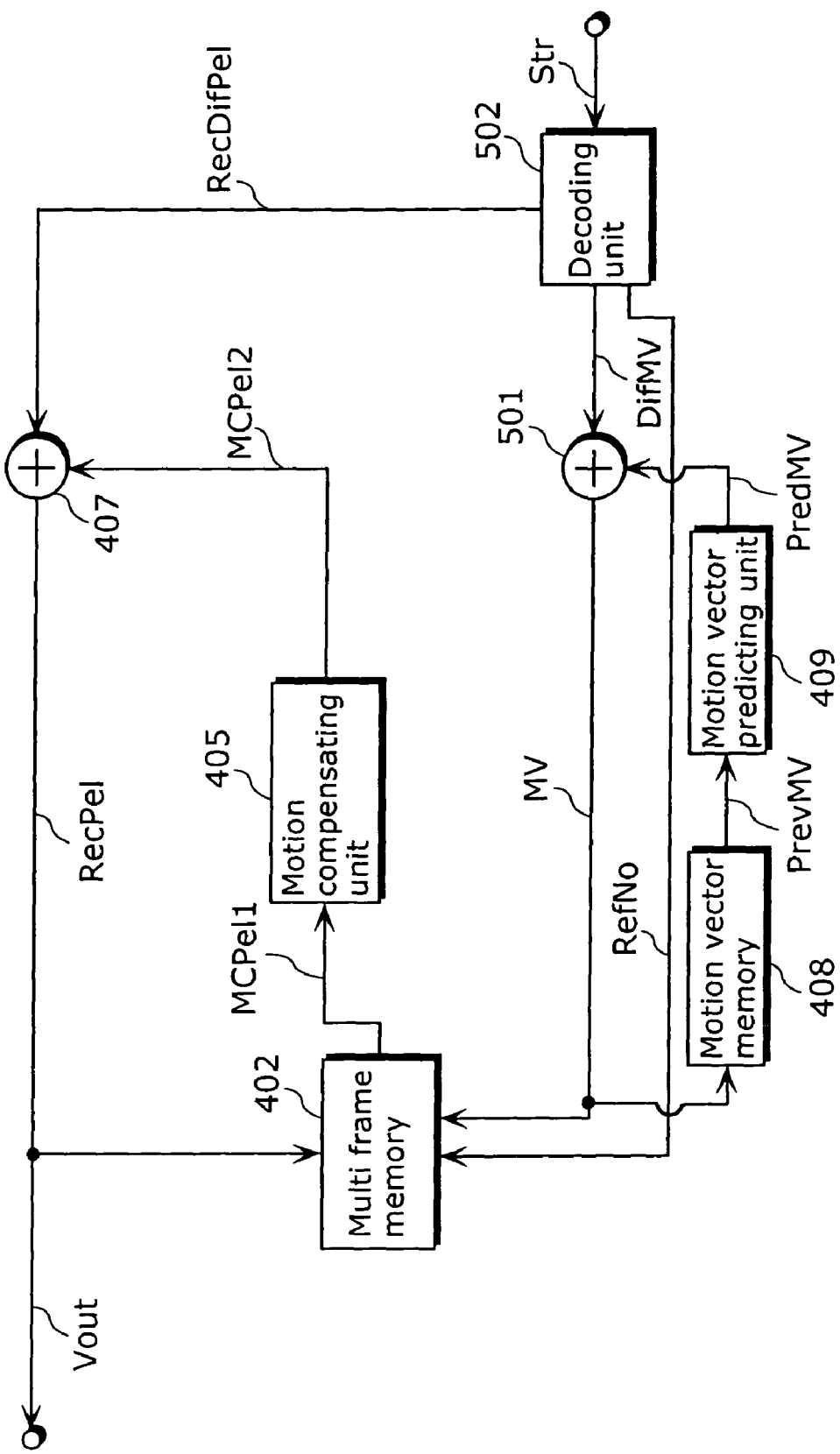
FIG. 2 is a block diagram showing the structure of a conventional inter-picture predictive decoding apparatus.
Figure 4:
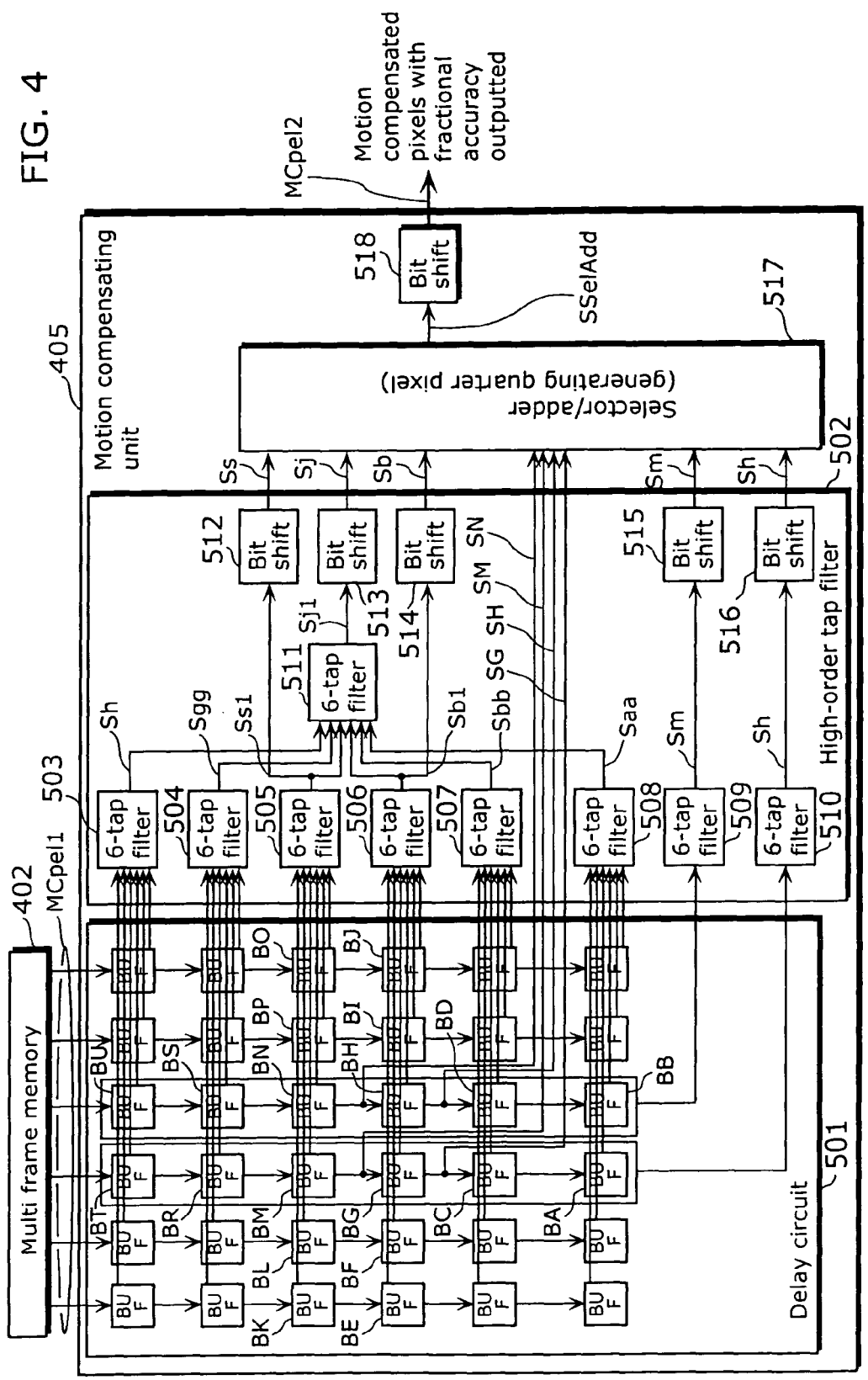
FIG. 4 is a circuit diagram showing the structure of a conventional motion compensating unit.
Figure 5:
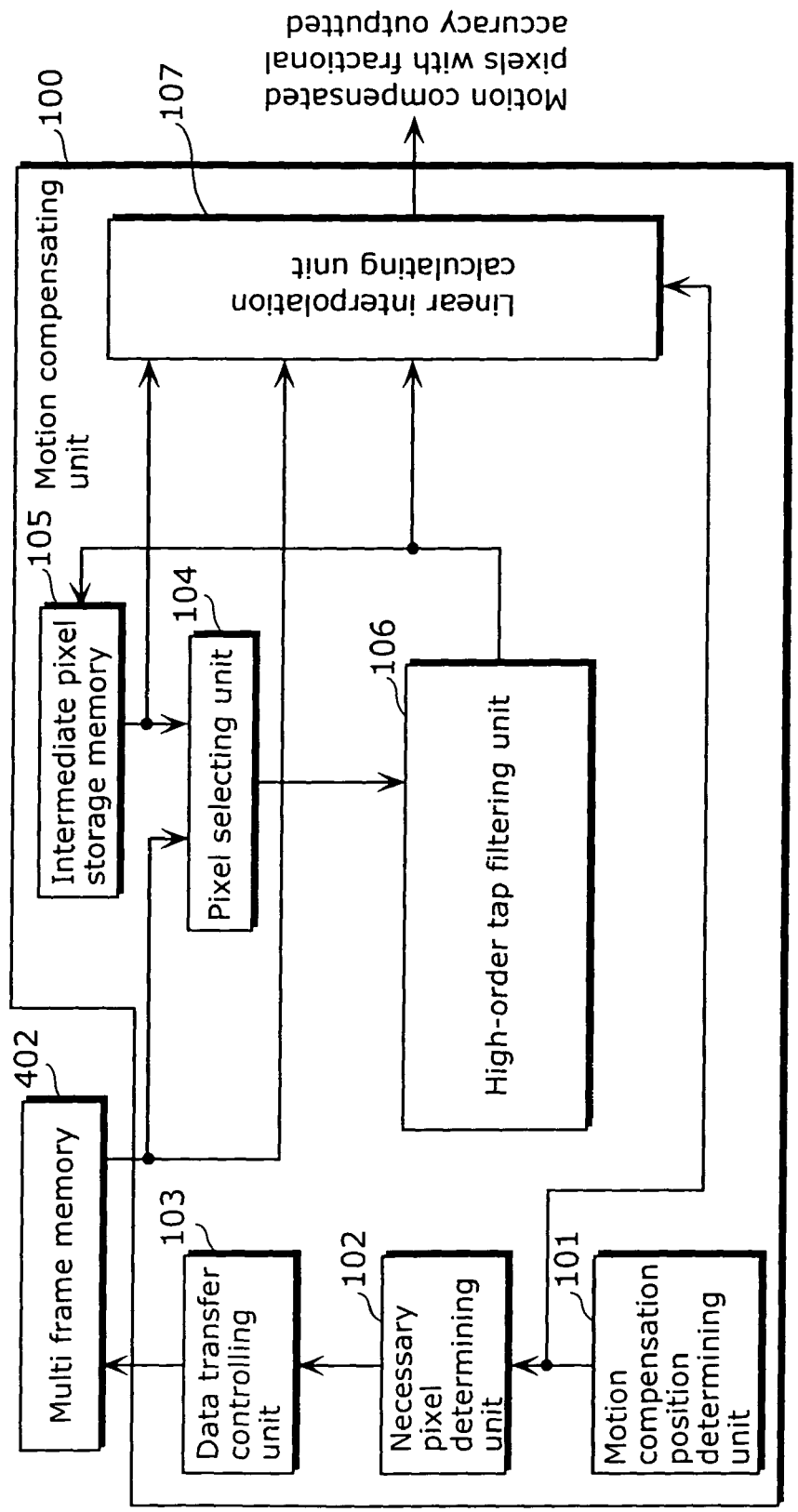
FIG. 5 is a block diagram showing a schematic structure of a motion compensating apparatus (motion compensating unit) according to a first embodiment of the present invention.
Figure 6:
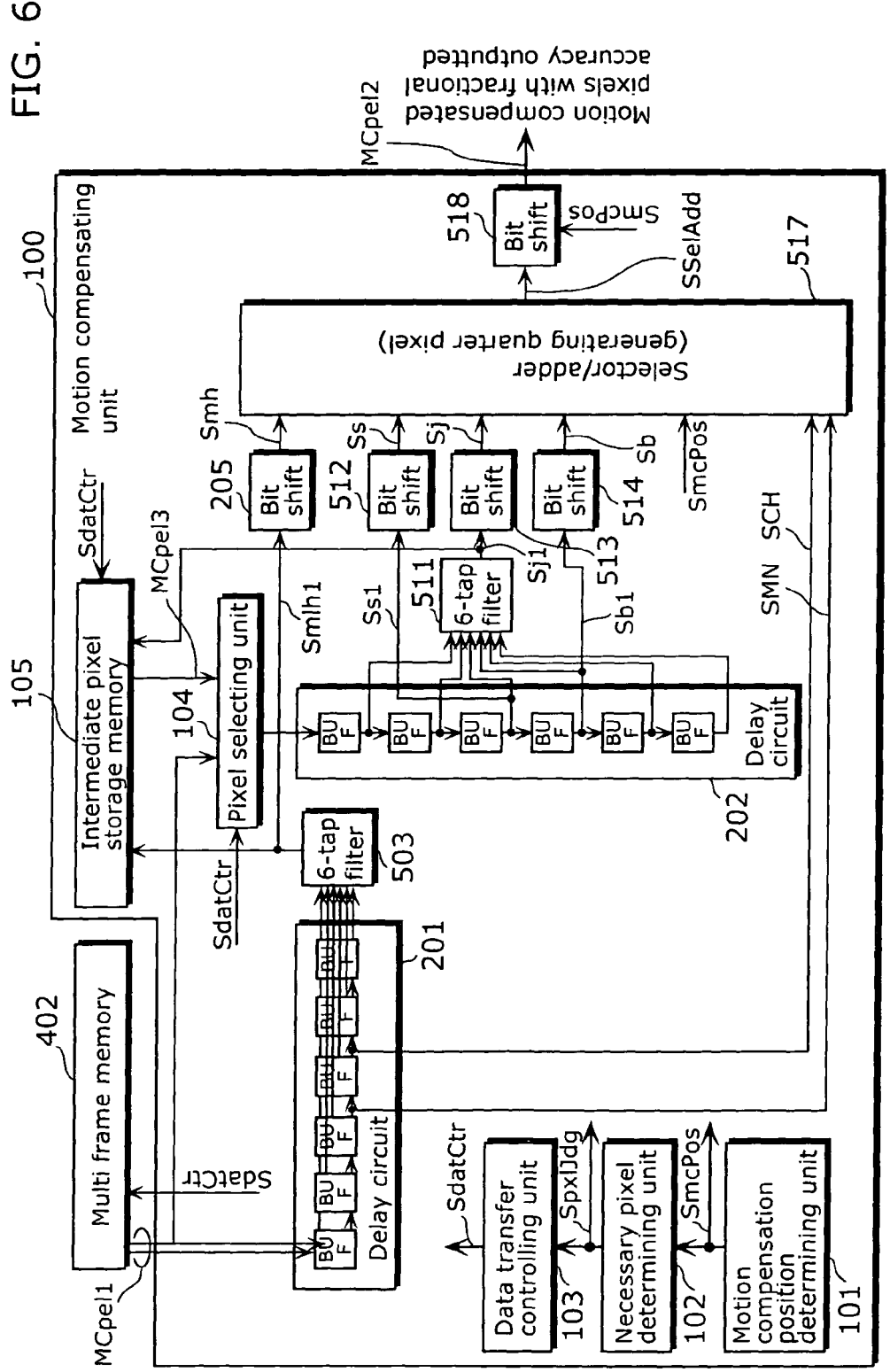
FIG. 6 is a block diagram showing a detailed structure of the motion compensating apparatus according to the first embodiment of the present invention.

FIG. 5 is a block diagram showing a schematic structure of a motion compensating apparatus (motion compensating unit) according to the first embodiment of the present invention, and FIG. 6 is a block diagram showing a detailed structure of such motion compensating apparatus. Note that the same elements as those of the motion compensating unit shown in FIG. 4 are assigned the same reference numbers, and the descriptions thereof are not given here. Also note that the present motion compensating apparatus shall be used as a motion compensating unit of the inter-picture predictive coding apparatus shown in FIG. 1 or of the inter-picture predictive decoding apparatus shown in FIG. 2.

The motion compensating apparatus 100, which is an apparatus for generating a motion-compensated pixel with fractional-pixel accuracy, is comprised of a motion compensation position determining unit 101, a necessary pixel determining unit 102, a data transfer controlling unit 103, a pixel selecting unit 104, an intermediate pixel storage memory 105, a high-order tap filtering unit 106, and a linear interpolation calculating unit 107. Motion compensation reference pixels (reference pixel data) MCpel1 are inputted from the multi frame memory 402 to this motion compensating apparatus 100.

The high-order tap filtering unit 106 includes: a delay circuit 201 and a delay circuit 202, each including six-stage× one pixel buffers, whereas the conventional technology includes six-stage×six pixels buffers; a 6-tap filter 503 and a 6-tap filter 511; a bit shift 512, a bit shift 513, a bit shift 514, and a bit shift 205. Meanwhile, the linear interpolation calculating unit 107, which is a second pixel selecting unit and a linear interpolation calculating unit, includes a selector/adder 206 and a bit shift 518.

Figure 3:
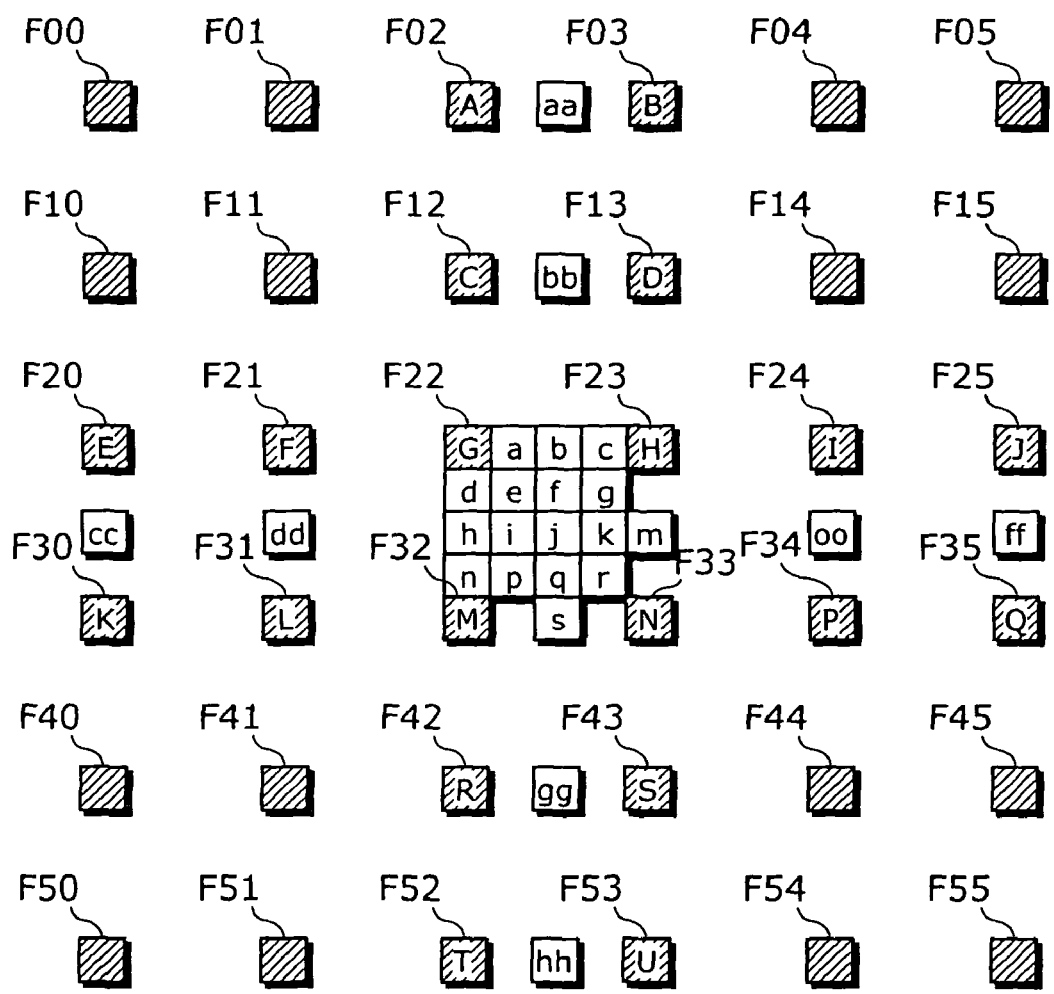
FIG. 3 is a schematic diagram for illustrating a method according to H.264 of performing pixel interpolation between luminous components.

The motion compensation position determining unit 101 determines, based on a motion vector, the position of pixels to be motion compensated, out of the pixels G, a, b, c, d, e, f, g, h, i, j, k, n, p, q, and r shown in FIG. 3, and outputs a motion compensation position signal SmcPos. The motion compensation position signal SmcPos is inputted to the selector/adder 206 and the bit shift 518 for use with the control of a selection and a bit shift of pixels necessary for generating a quarter pixel.

The necessary pixel determining unit 102 determines, based on the inputted motion compensation position signal SmcPos, pixels necessary for performing 6-tap filtering, depending on the partitioning shape of a macroblock (MB) and the resulting shape as well as on the order in which 6-tap filtering is performed, and outputs necessary pixel information SpxlJdg.

The data transfer controlling unit 103 outputs a data transfer control signal SdatCtr intended for controlling the order of taking out data to be transferred, according to the inputted necessary pixel information SpxlJdg. The data transfer control signal SdatCtr is inputted to the multi frame memory 402, the intermediate pixel storage memory 105, and the pixel selecting unit 104, to be used to control filtering operation processing.

The intermediate pixel storage memory 105 is a memory for storing all data of pixels at half-pixel positions in the horizontal direction included in all blocks to be coded, such as the pixels aa, bb, b, s, gg, and hh shown in FIG. 3, in the case where horizontal filtering, for example, is preferentially performed. The intermediate pixel storage memory 105 outputs intermediate pixel data once stored therein, as half-pixel data MCpel3 before a bit shift operation is performed.

The pixel selecting unit 104 selects either the reference pixel data MCpel1 outputted from the multi frame memory 402 or the half-pixel data MCpel3 outputted from the intermediate pixel storage memory 105.

The bit shift 205 has, as its input, an output signal Sm1$h$1 from the 6-tap filter 503, and outputs a signal Smh for the position of a pixel m or a pixel h, as the result of performing a bit shift. The bit shift 512 has, as its input, delay data Ss1 from the third stage of the delay circuit 202, and outputs a signal Ss for the position of a pixel s, as the result of performing a bit shift. The bit shift 513 has, as its input, an output signal Sj1 from the 6-tap filter 511, and outputs a signal Sj for the position of a pixel j, as the result of performing a bit shift. The bit shift 514 has, as its input, delay data Sb1 from the fourth stage of the delay circuit 202, and outputs an Sb signal for the position of a pixel b, as the result of performing a bit shift.

The selector/adder 206: has, as its input, the output signal Smh from the bit shift 205, the output signal Ss from the bit shift 512, the output signal Sj from the bit shift 513, the output signal Sb from the bit shift 514, the output signal SMN for the position of a pixel M or a pixel N, which is delay data from the third stage of the delay circuit 201, and the output signal SGH for the position of a pixel G or a pixel H, which is delay data from the fourth stage of the delay circuit 201; selects signals according to the motion compensation position signal SmcPos signal; adds the signals where necessary; and outputs the resultant as a signal SSelAdd.

The bit shift 518, which has the signal SSelAdd, as its input, performs a bit shift of it when necessary, according to the motion compensation position signal SmcPos, and outputs the resultant as a motion-compensated pixel MCpel2.

Figure 7:
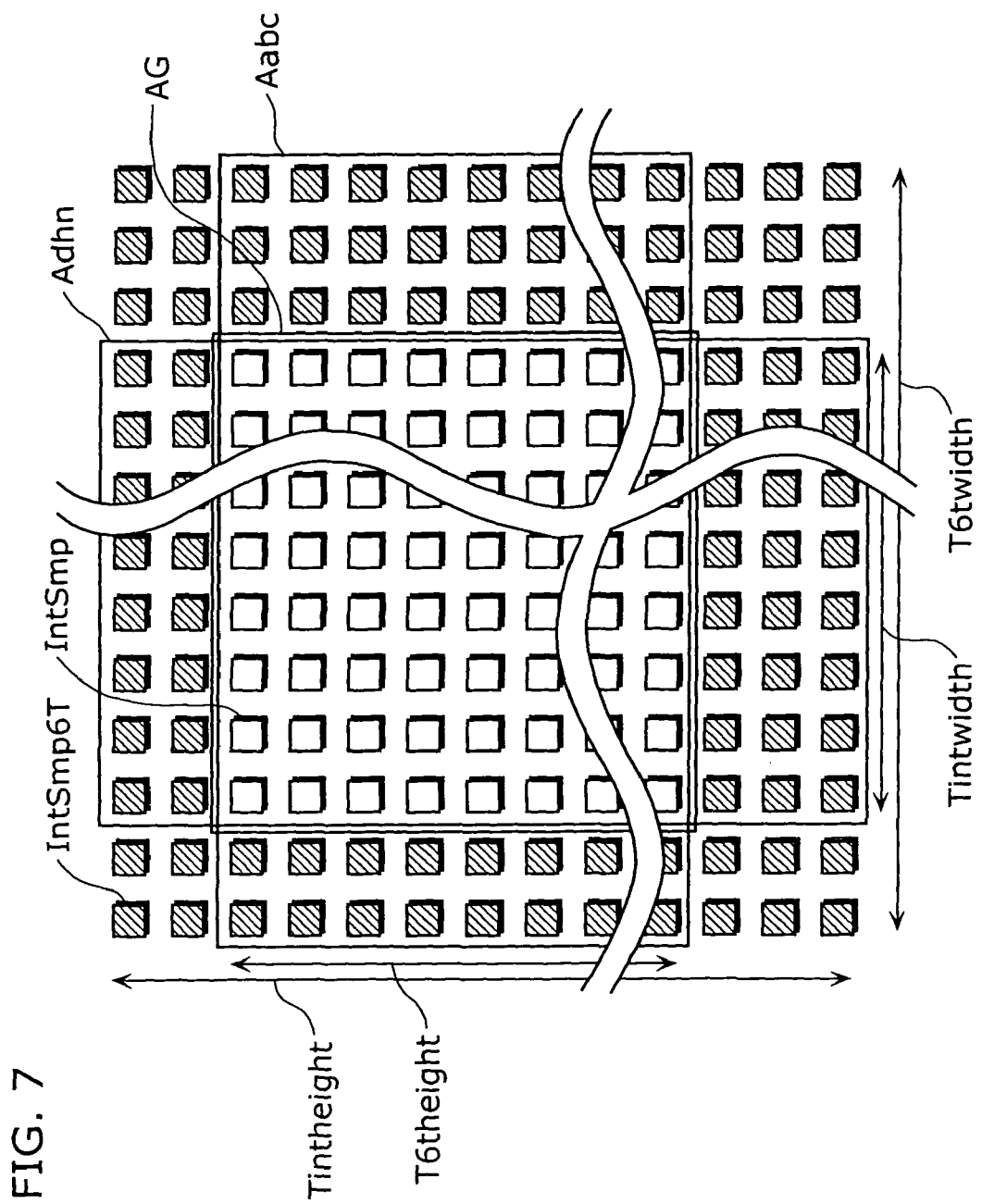
FIG. 7 is a diagram showing arrays of integer pixels on which 6-tap filtering is performed.

Next, referring to FIG. 7, a detailed description is given of operations performed by the necessary pixel determining unit 102.

FIG. 7 is a diagram showing arrays of integer pixels on which 6-tap filtering is performed. In FIG. 7, each integer-pixel IntSmp represented by a square is an integer pixel at a position to be motion compensated indicated by a motion vector. Each 6-tap applied pixel IntSmp6T represented by a circle is a pixel which is positioned around an integer pixel IntSmp and which is necessary for performing 6-tap filtering.

A segment Tintwidth, which represents a segment of integer pixels in the horizontal direction, takes one of 16, 8, 4 as its value, depending on the shape of a current block to be motion compensated. A segment T6twidth, which represents a segment of pixels in the horizontal direction including neighboring pixels necessary for performing 6-tap filtering, takes one of 21, 13, and 9 as its value, depending on the shape of a current block.

A segment Tintheight, which represents a segment of integer pixels in the vertical direction, takes one of 16, 8, and 4 as its value, depending on the shape of a current block to be motion compensated. A segment T6theight, which represents a segment of pixels in the vertical direction including neighboring pixels necessary for performing 6-tap filtering, takes one of 21, 13, and 9 as its value, depending on the shape of a current block.

An area Aabc represents an area of integer pixels whose segment in the horizontal direction is T6twidth and whose segment in the vertical direction is Tintheight. An area Adhn represents an area of integer pixels whose segment in the horizontal direction is Tintwidth and whose segment in the vertical direction is T6theight. An area AG represents an area of integer pixels whose segment in the horizontal direction is Tintwidth and whose segment in the vertical direction is Tintheight.

For example, in the case of generating a motion-compensated image at the fractional-pixel positions of a, b, and c shown in FIG. 3, vertical filtering is not necessary, and thus an area to be applied only with vertical filtering does not need to be processed. In this case, therefore, the necessary pixel determining unit 102 determines that an area represented by the area Aabc is necessary. Similarly, in the case of generating a motion-compensated image at the fractional-pixel positions of d, h, and n, horizontal filtering is not necessary, and thus an area to be applied only with horizontal filtering does not need to be processed. In this case, therefore, the necessary pixel determining unit 102 determines that area represented by the area Adhn is necessary. Moreover, in the case of the position G, there is no need to generate any fractional pixels, and thus the necessary pixel determining unit 102 determines that the area AG is necessary.

Figure 8:
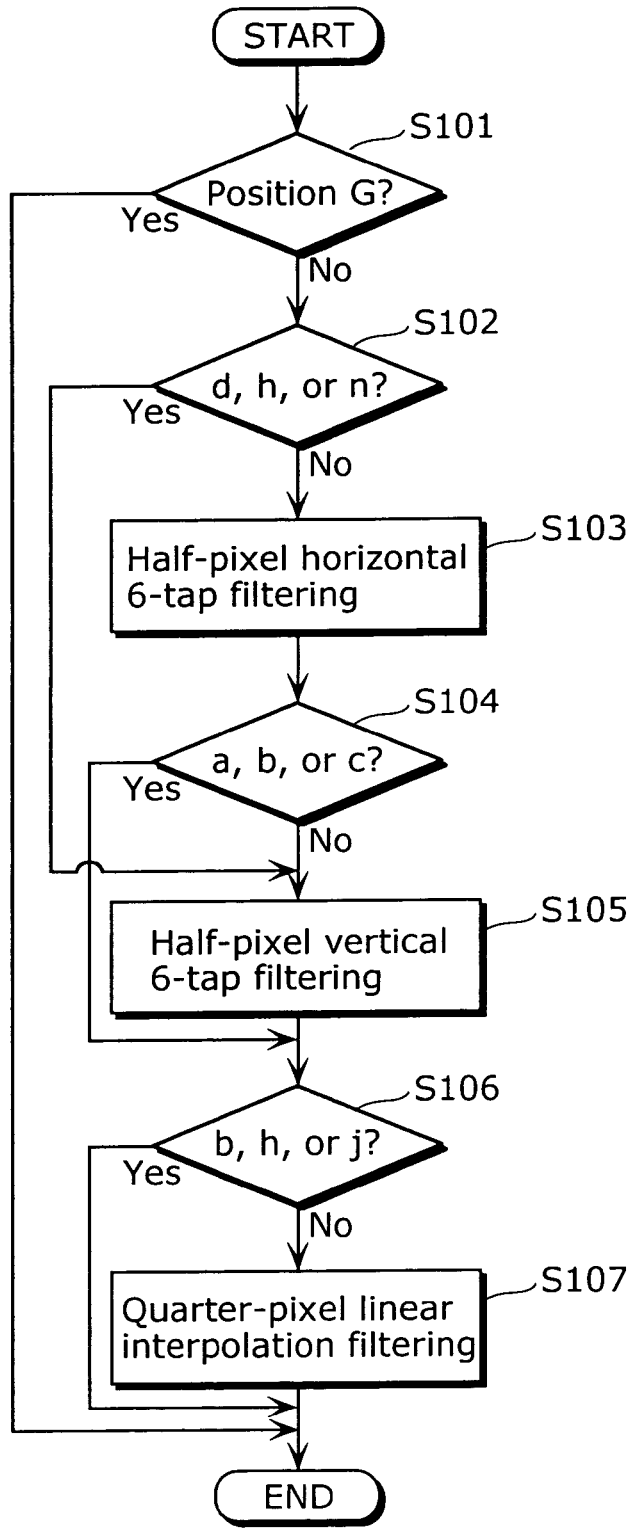
FIG. 8 is a flowchart showing the flow of operations performed by a data transfer controlling unit to control data transfer.

Next, referring to FIG. 8, a detailed description is given of operations performed by the data transfer controlling unit 103.

FIG. 8 is a flowchart showing the flow of operations performed by the data transfer controlling unit 103 to control data transfer.

First, the data transfer controlling unit 103 determines whether or not the position for which a motion-compensated image should be generated is the position of the pixel G included in the pixels shown in FIG. 3, that is, G, a, b, c, d, e, f, g, h, i, j, k, n, p, q, and r (Step S101). In the case where the result of such determination is that the position for which a motion-compensated image should be generated is the position of the pixel G (YES in Step S101), the process is terminated without performing fractional-pixel image filtering.

Meanwhile, in the case where the position for which a motion-compensated image should be generated is a position other than that of the pixel G (NO in Step S101), the data transfer controlling unit 103 determines whether or not the position is one of the position of the pixels d, h, and n (Step S102). In the case where the result of the determination is that the position for which a motion-compensated image should be generated is none of the position of the pixels d, h, and n (NO in Step S102), 6-tap filtering is performed to generate an image at the position that is half a pixel off in the horizontal direction (Step S103). Furthermore, the data transfer controlling unit 103 determines whether or not the position for which a motion-compensated image should be generated is one of the position of the pixels a, b, and c (Step S104). In the case where the result of the determination is that the position for which a motion-compensated image should be generated is none of the position of the pixels a, b, and c (NO in Step S104) and where the result of the above determination process (Step S102) is that the position for which a motion-compensated image should be generated is one of the position of the pixels d, h, and n (YES in Step S102), 6-tap filtering is performed to generate an image at the position that is half a pixel off in the vertical direction (Step S105).

The data transfer controlling unit 103 determines whether or not the position for which a motion-compensated image should be generated is one of the position of the pixels b, h, and j (Step S106). In the case where the result of the determination is that the position for which a motion-compensated image should be generated is none of the position of the pixels b, h, and j (NO in Step S106), that is, in the case where the position is none of the position of the pixels G, b, h, and j, quarter-pixel linear interpolation filtering is performed (Step S107).

Meanwhile, in the case where the position for which a motion-compensated image should be generated is the position of one of the pixels b, h, and j (YES in Step S106), the process is terminated without performing quarter-pixel linear interpolation filtering.

By the data transfer controlling unit 103 controlling the above procedures, the motion compensating unit 100 is controlled and a motion-compensated image MCpel2 is outputted. Note that it is also possible to perform vertical filtering first and then perform horizontal filtering by exchanging the controls between: the process of determining whether or not the position for which a motion-compensated image should be generated is the position of one of the pixels d, h, and n (Step S102) and the process of performing horizontal filtering (Step S103); and the process of determining whether or not the position for which a motion-compensated image should be generated is the position of the one of the pixels a, b, and c (Step S104) and the process of performing vertical filtering (Step S105).

The following continues a detailed description of the filtering operations performed on a block-shaped area containing M horizontal pixels and N vertical pixels, along with the flow of pixel signals. Although the following describes the operations for generating a motion-compensated image for the fractional-pixel positions of the pixels e, f, g, i, j, k, p, q, and r shown in FIG. 3 for which filtering operations needs to be performed in both the horizontal direction and vertical direction, taking an example case where horizontal filtering is performed first for simplification purposes, it is also possible to perform vertical filtering first.

First, the data transfer controlling unit 103 reads pixel data of each pixel one by one in the horizontal direction from the multi frame memory 402, and outputs the read-out pixel data into the delay circuit 201. The delay circuit 201 has a 6-stage FIFO structure, and pieces of data equivalent to one row in the segment T6twidth in the horizontal direction shown in FIG. 7, are sequentially inputted thereto, including those of neighboring pixels necessary for 6-tap filtering. Delay data from the delay circuit 201 equivalent to 6 pixels is inputted to the 6-tap filter 503, and the result of 6-tap filtering is outputted per cycle after the sixth pixel is inputted.

The result of 6-tap filtering outputted from the 6-tap filter 503 is inputted to the intermediate pixel storage memory 105 and the bit shift 503. In the case where the delay circuit 201 and the 6-tap filter 503 make one set, M+5 cycles are required to perform filtering for one row, and thus processes are repeated to filter N+5 rows including neighboring pixels necessary for filtering. The resultant is stored into the intermediate pixel storage memory 105 as fractional-pixel data (position of b) which is half a pixel off in the horizontal direction.

Next, the data transfer controlling unit 103, in order to generate a fractional pixel (position of h) which is half a pixel off in the vertical direction, reads pixel data of each pixel one by one in the vertical direction from the multi frame memory 402, and inputs the read-out pixel data into the delay circuit 201. As in the case of the horizontal direction, the result of 6-tap filtering is outputted per cycle after the sixth pixel is inputted. In the case where the delay circuit 201 and the 6-tap filter 503 make one set, N+5 cycles are required to perform filtering for one columns, and thus processes are repeated to filter M+5 rows including neighboring pixels necessary for filtering, the resultant of which is outputted to the bit shift 205.

At the same time, the data transfer controlling unit 103, in order to generate a fractional pixel (position of j) which is half a pixel off in both the horizontal and vertical directions, reads pixel data of each pixel one by one from the intermediate pixel storage memory 105, and inputs the read-out data into the delay circuit 202 via he pixel selecting unit 104. Delay data from the delay circuit 202 equivalent to 6 pixels is inputted to the 6-tap filter 511, and the result of 6-tap filtering is outputted per cycle after the sixth pixel is inputted.

Next, the selector/adder 206 performs necessary processes through calculations represented by Equation 10 to Equation 21, depending on the position of pixels to be motion compensated, and outputs the resultant as data SselALdd. The bit shift 518, to which the data SSelAdd has been inputted, performs a bit shift of it where necessary, and outputs a motion-compensated image MCPel2. Here, the selector/adder 206 and the bit shift 518 do not perform any additions or bit shifts for the positions of G, b, h, and j since there is no need to perform such processes.

Note that the delay circuit 206 and the 6-tap filter 511 may also be utilized for horizontal filtering, in which case the pixel selecting unit 104 selects data not inputted from the intermediate pixel storage memory 105 but data inputted from the multi frame memory 402 so as to perform filtering on it, and the result outputted from the 6-tap filter 511 is inputted to the intermediate pixel storage memory 105. In this case, the number of filtering cycles in the horizontal direction can be reduced to about half, compared with the case of using one pair of the delay circuit 201 and the 6-tap filter 503.

Moreover, it is possible to construct the delay circuit 201 and the 6-tap filter 503, or the delay circuit 202 and the 6-tap filter 511 as a parallel processing resource, in which case the transfer capability between the multi frame memory 402 and the motion compensation unit 100 is set to be equal or higher than the processing capability of the parallelized 6-tap filter. Here, the optimum structure is achieved by making the transfer capability and the processing capability equal to each other.

Thus, when a motion-compensated image is generated through the above-described procedures, the respective numbers of pixels to be transferred in the case of transferring one 16×16 block, which is the maximum block, and transferring sixteen 4×4 blocks, which is the smallest block, are represented by the following equations, respectively:

$$((16+5)\times(16+5)\times 1 \text{ pixel width} + 16\times(16+5)\times 1 \text{ pixel width})\times 1 \text{ block} = 777 \qquad (26), \text{ and}$$

$$((4+5)\times(4+5)\times 1 \text{ pixel width} + 4\times(4+5)\times 1 \text{ pixel width})\times 16 \text{ blocks} = 1,872 \qquad (27).$$

Thus, from Equation 22, Equation 23, Equation 26, and Equation 27, the amount of data transfer can be reduced to 1/2.6 for the 16×16 block, and 1/1.8 for the 4×4 blocks, compared with the conventional amount of data transfer.

As described above, it is possible to reduce the number of pixels to be transferred from the multi frame memory 402 to the motion compensating apparatus 100, since there are provided the delay circuit 201 and the delay circuit 202, and the result of 6-tap filtering outputted from the 6-tap filter 503 is stored into the intermediate pixel storage memory and then to the delay circuit 202, where filtering is performed.

(Second Embodiment)

Further to the method described in the first embodiment, the present embodiment describes the case where data transfer is carried out after determining in which one of the horizontal direction and the vertical direction 6-tap filtering operations should be performed first. Note that the structure of the present embodiment is the same as the structure of the first embodiment, and therefore the following description uses the block diagram shown in FIG. 6.

The only difference from the method described in the first embodiment lies in a control method used in the data transfer controlling unit 103. The following gives a detailed description of only data transfer control and operation processes thereof.

The results of 6-tap filtering operations are the same regardless of in which one of the horizontal direction and the vertical direction they are performed first. Referring to FIG. 9 to FIG. 11, a method of controlling the order of performing vertical and horizontal filtering is described.

FIGS. 9A to 9D are diagrams, each showing an example of a block for which a motion-compensated image is generated. Here, the block is in the shape sized 8 pixels in the horizontal direction M and 4 pixels in the vertical direction N, to which neighboring pixels necessary for performing 6-tap filtering are added by the number equivalent to 5 (=T−1) pixels, respectively. In FIGS. 9A to 9D, each pixel in the current block is represented by a square, each neighboring pixel necessary for 6-tap filtering is represented by a diagonally shaded square, and each fractional pixel is represented by a circle.

Figure 9A:
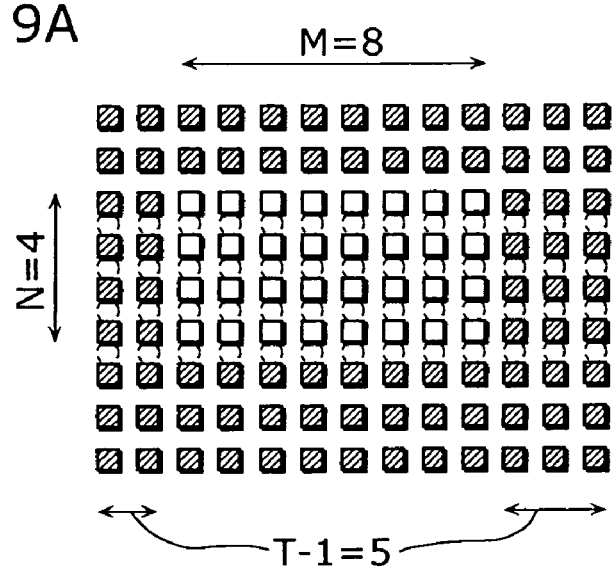
FIG. 9A is a diagram showing an example block for which a motion-compensated image is generated.
Figure 9B:
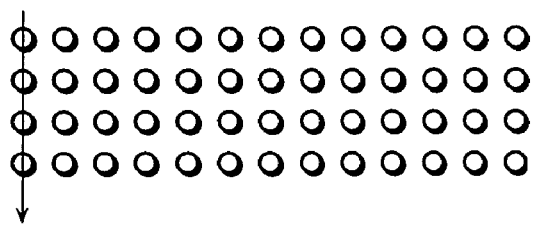
FIG. 9B is a diagram showing fractional pixels to be stored into an intermediate pixel storage memory, each of which is half a pixel off in the vertical direction.
Figure 9C:
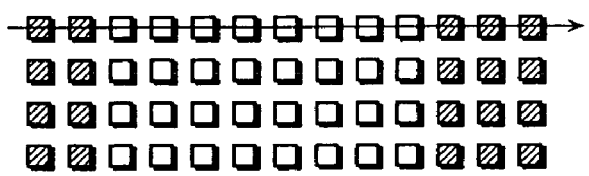
FIG. 9C is a diagram showing pixels that need to be transferred in a second filtering (in the horizontal direction)
Figure 9D:
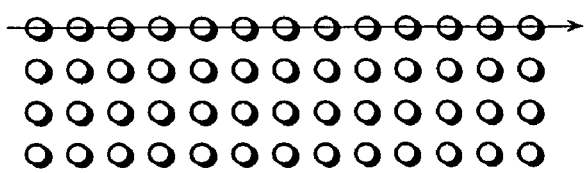
FIG. 9D is a diagram showing the second filtering (in the horizontal direction) performed on the fractional pixels, stored in the intermediate pixel storage memory, each of which is half a pixel off in the vertical direction.

When a vertical filtering is first performed on the block shown in FIG. 9A, fractional pixels as shown in FIG. 9B, each being half a pixel off in the vertical direction, are stored into the intermediate pixel storage memory 105. When the second filtering (in the horizontal direction) is performed, pixels that need to be transferred from the multi frame memory 402 to the motion compensating unit 100 are pixels excluding the neighboring pixels in the top two rows and the bottom three rows, as shown in FIG. 9C. Furthermore, in order to generate fractional pixels that are half a pixel off in both the horizontal and vertical directions, fractional pixels shown in FIG. 9D, stored in the intermediate pixel storage memory 105, that are half a pixel off in the vertical direction are read out, to be used for the second filtering (in the horizontal direction).

As described above, in the case of performing vertical filtering first, the pixel capacity required by the intermediate pixel storage memory 105 or the number of pixels to be transferred in filtering in the second direction, is represented by the following equation:

$$(8+5) \times 4 = 52 \tag{28}$$

Figure 10A:
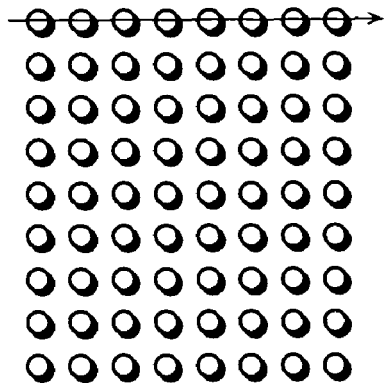
FIG. 10A is a diagram showing fractional pixels, to be stored into the intermediate pixel storage memory, each of which is half a pixel off in the horizontal direction.
Figure 10B:
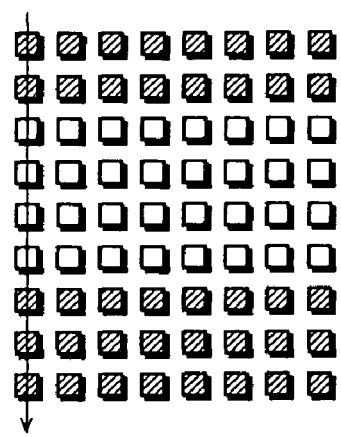
FIG. 10B is a diagram showing pixels that need to be transferred in a second filtering (in the vertical direction)
Figure 10C:
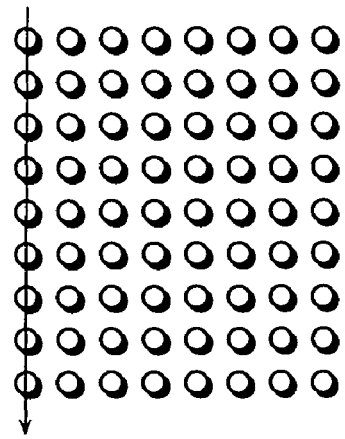
FIG. 10C is a diagram showing the second filtering (in the vertical direction) performed on the fractional pixels stored in the intermediate pixel storage memory, each of which is half a pixel off in the horizontal direction.

Meanwhile, when a horizontal filtering is first performed on the block shown in FIG. 9A, fractional pixels as shown in FIG. 10A, each being half a pixel off in the horizontal direction, are stored into the intermediate pixel storage memory 105. When the second filtering (in the vertical direction) is performed, pixels that need to be transferred from the multi frame memory 402 to the motion compensating unit 100 are pixels excluding the neighboring pixels in the right two columns and the left three columns, as shown in FIG. 10B. Furthermore, in order to generate fractional pixels that are half a pixel off in both the vertical and horizontal directions, fractional pixels, stored in the intermediate pixel storage memory 105 shown in FIG. 10C, that are half a pixel off in the horizontal direction are read out, to be used for the second filtering (in the vertical direction).

As described above, in the case of performing horizontal filtering first, the pixel capacity required by the intermediate pixel storage memory 105 or the number of pixels to be transferred in filtering in the second direction, is represented by the following equation:

$$8 \times (4+5) = 72 \tag{29}$$

The above description has been given by taking, as an example, a block sized 8 pixels in the horizontal direction M, and 4 pixels in the vertical direction N. Next, a description is given of the case of a block with a generalized sized of M pixels in the horizontal direction and N pixels in the vertical direction.

FIGS. 11A to 11C are diagrams, each showing a unit of a block for which a motion-compensated image is generated. FIG. 11A, which is a simplified illustration of FIG. 7, shows a block for which a motion-compensated image is generated. FIG. 11A shows that the block is sized M pixels in the horizontal direction and N pixels in the vertical direction, and that neighboring pixels used for filtering is added in number equivalent to T−1, where T is the number of filter taps.

In this case, pixels in an area sized (M+T−1)×(N+T−1) need to be transferred from the memory. At this time, the pixel capacity required by the intermediate pixel storage memory 105 shown in FIG. 5 is M×(N+T−1) in the case where horizontal filtering is performed first, and (M+T−1)×N in the case where vertical filtering is performed first.

Similarly, the number of pixels that need to be transferred from the multi frame memory 402 to the motion estimating unit 100 when subsequent filtering is performed in another direction, is M×(N+T−1) in the case where horizontal filtering is performed first, and (M+T−1)×N in the case where vertical filtering is performed first.

Thus, a difference value between pixel capacities required by the intermediate pixel storage memory 105 or a difference value between the numbers of pixels to be transferred in filtering in the second direction, in the case where horizontal filtering is performed first and where vertical filtering is first, is represented by the following equation:

$$|M \times (N + T - 1) - (M + T - 1) \times N| = |(M - N)(T - 1)|. \tag{30}$$

Thus, the data transfer controlling unit 103 compares the number of horizontal pixels M and the number of vertical pixels N. When the result of the comparison is M<N, horizontal filtering is performed first, and vertical filtering is performed next, whereas when the result of the comparison is M>N, vertical filtering is performed first, and horizontal filtering is performed next. This reduces the capacity required by the intermediate pixel storage memory 105 for |(M−N)(T−1)| as well as reducing the number of pixels to be transferred in filtering in the second direction.

Note that the H.264 standard specifies that T=6 and that the value of each of M and N is any of 16, 8, and 4. In the case of generating a motion-compensated image for one macroblock (MB) segmented into 16×8 block shape according to the H.264 standard, the number of process cycles to be required is represented by Equation 31 in the case where 6-tap filtering is performed in the horizontal direction first. Meanwhile, the number of process cycles to be required is represented by Equation 32 in the case where 6-tap filtering is performed in the vertical direction first, where the number of pixels to be transferred is reduced by (962−882)/962=8%, compared with the case where horizontal filtering is performed first.

$$((16+5) \times (8+5) \times 1 \text{ pixel width} + 16 \times (8+5) \times 1 \text{ pixel width}) \times 2 \text{ block} = 962 \tag{31}$$

$$((16+5) \times (8+5) \times 1 \text{ pixel width} + (16+5) \times 8 \times 1 \text{ pixel width}) \times 2 \text{ blocks} = 882 \tag{32}$$

Similarly, in the case of generating a motion-compensated image for one macroblock (MB) segmented into 8×4 block shape, the number of process cycles to be required is represented by Equation 33 in the case where 6-tap filtering is performed in the horizontal direction first as described above. Meanwhile, the number of process cycles to be required is represented by Equation 34 in the case where 6-tap filtering is performed in the vertical direction first, where the number of pixels to be transferred is reduced by (1,512−1,352)/1,352=11%, compared with the case where horizontal filtering is performed first.

$$((8+5) \times (4+5) \times 1 \text{ pixel width} + 8 \times (4+5) \times 1 \text{ pixel width}) \times 8 \text{ block} = 1,512 \tag{33}$$

$$((8+5) \times (4+5) \times 1 \text{ pixel width} + (8+5) \times 4 \times 1 \text{ pixel width}) \times 8 \text{ blocks} = 1,352 \tag{34}$$

As described above, since the data transfer controlling unit 103 transfers data after comparing the number of horizontal pixels M and the number of vertical pixels N in the current block, and then by determining in which one of the horizontal direction and vertical direction a 6-tap filtering operation should be performed first, it is possible to reduce the amount of data to be transferred from the multi frame memory 402 to the motion compensating apparatus 100, while allowing the intermediate pixel storage memory 105 to implement a reduced memory capacity.

(Third Embodiment)

The present embodiment describes the case of performing filtering, using the method described in the first embodiment, on a segmented current block. Note that the structure of the present embodiment is the same as the structure of the first embodiment, and therefore the following description is given using the block diagram shown in FIG. 6.

The only difference from the method described in the first embodiment lies in a control method used in the data transfer controlling unit 103. The following gives a detailed description of only data transfer control and operation processes thereof.

6-tap filtering does not necessarily have to be performed on a block with a specified shape, and thus the same result is achieved when filtering is performed on a segmented block. Referring to FIGS. 11 to 14, a filtering control method that adopts block segmentation is described.

Figure 12:
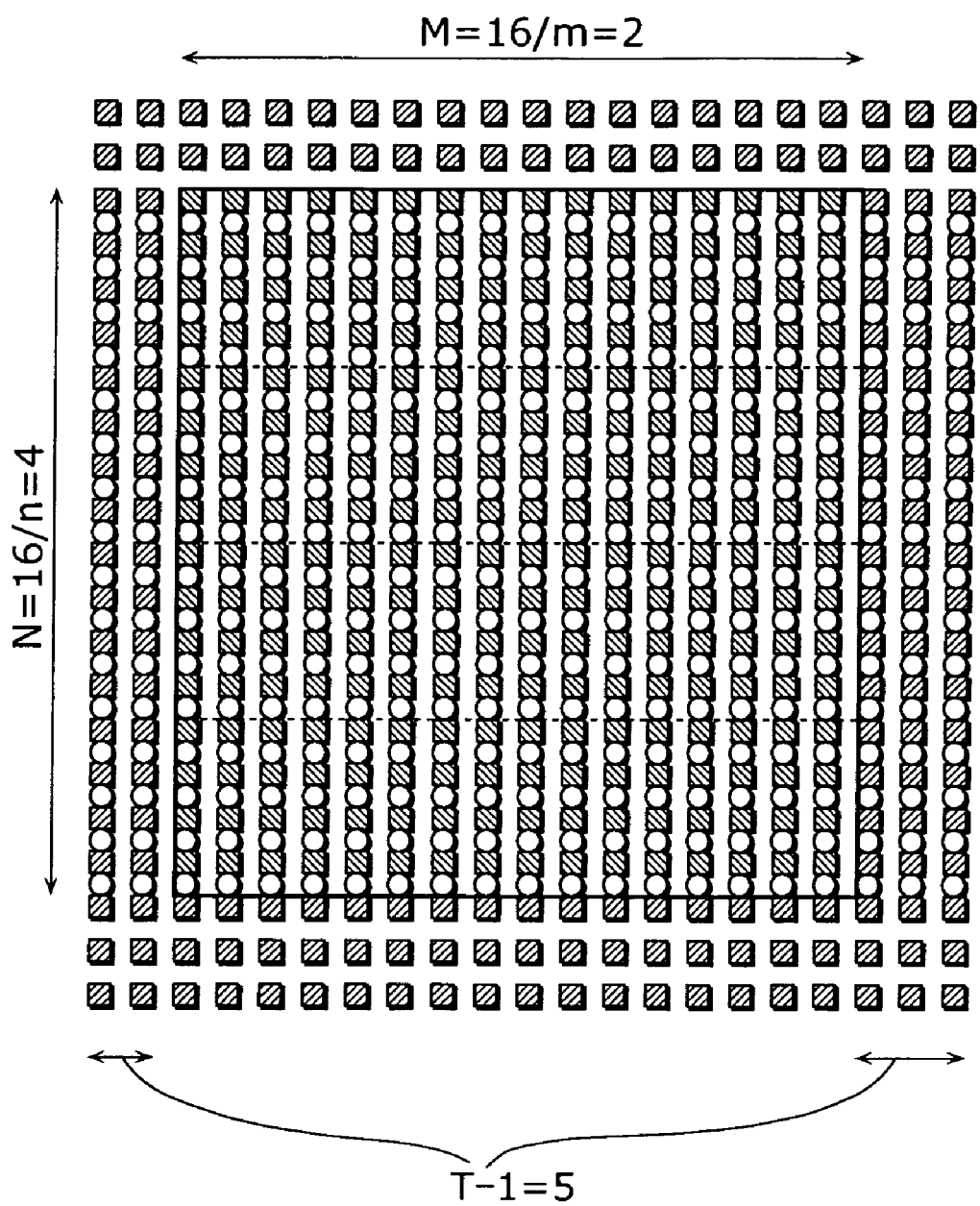
FIG. 12 is a diagram showing an example of a block for which a motion-compensated image is generated.
Figure 13:
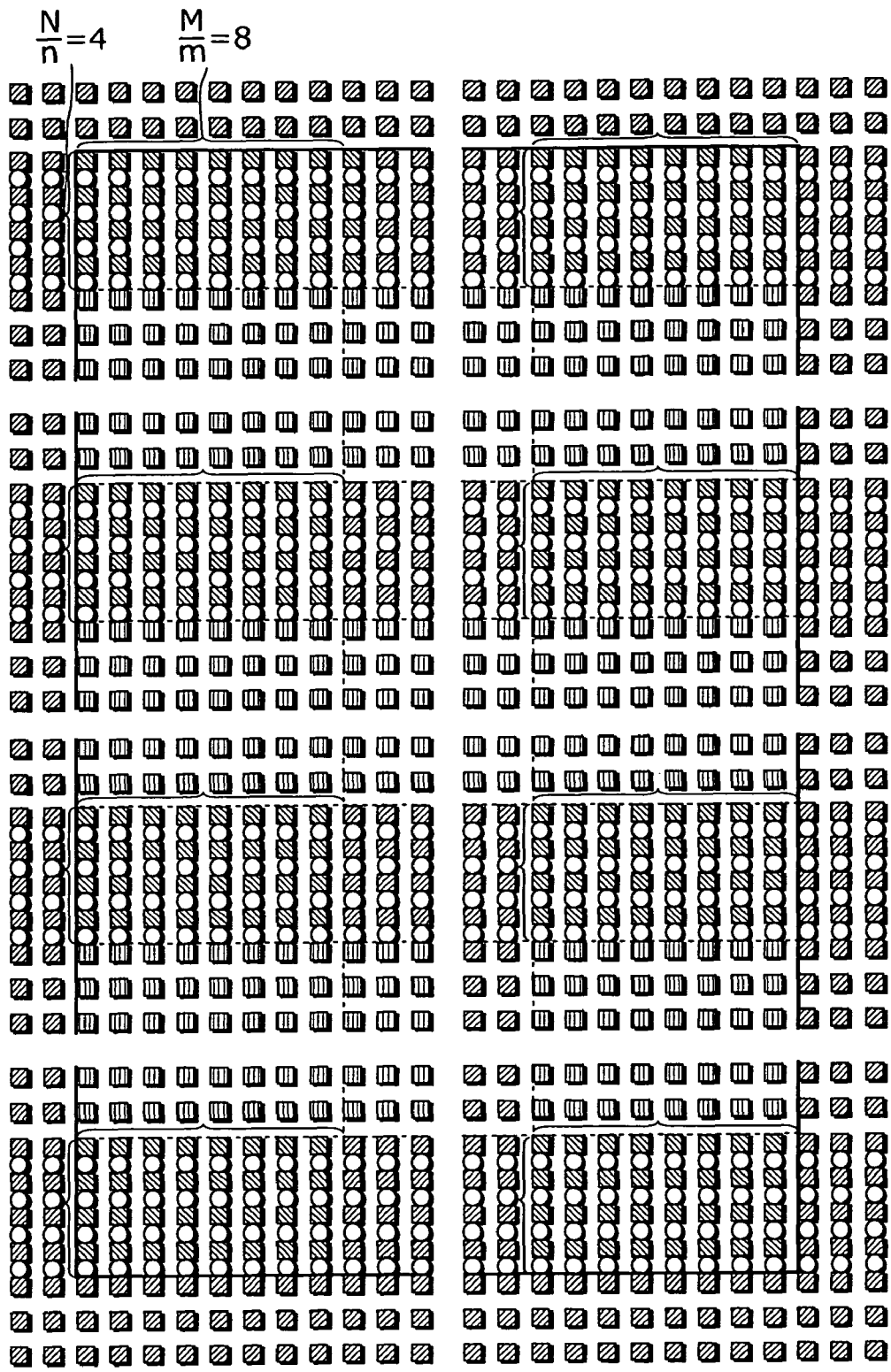
FIG. 13 is a diagram showing neighboring pixels that are necessary to perform filtering, on a segmented area basis.

FIG. 12 is a diagram showing an example of a block for which a motion-compensated image is generated. Here, the block is in the shape sized 16 pixels in the horizontal direction M and 16 pixels in the vertical direction N, to which neighboring pixels necessary for performing 6-tap filtering are added by the number equivalent to 5 (=T−1), respectively. In FIG. 12, each pixel in the current block is represented by a hollow square, each neighboring pixel necessary for 6-tap filtering is represented by a diagonally shaded square, and each fractional pixel is represented by a circle.

When the block shown in FIG. 12 is processed after being segmented into 2 segments in the horizontal direction and into 4 segments in the vertical direction, each of the segmented blocks, which is 8 pixels in the horizontal direction M/m and 4 pixels in the vertical direction N/n, is added with neighboring pixels necessary for performing 6-tap filtering and then transferred from the multi frame memory 402 to the motion compensating apparatus 100.

In the case where the block is segmented and vertical filtering is performed first, the pixel capacity required by the intermediate pixel storage memory 105 is represented by the following equation as in the case of the second embodiment:

$$(8+5) \times 4 = 52 \tag{35}$$

For example, in the case where filtering is performed without segmenting the block, the pixel capacity required by the intermediate pixel storage memory 105 is represented by the following equation:

$$(16+5) \times 16 = 336 \tag{36}$$

The above description has been given by taking an example case of processing a block, sized 16 pixels in the horizontal direction M and 16 pixels in the vertical direction N, into 2 segments in the horizontal direction and 4 segments in the vertical direction. Next, a description is given of the case of processing a block with a generalized size of M pixels in the horizontal direction and N pixels in the vertical direction, after segmenting it into m segments in the horizontal direction and n segments in the vertical direction.

FIG. 11B illustrates the segmentation of a block shown in FIG. 11A for which a motion-compensated image is generated, into m segments in the horizontal direction (M/m is a natural number) and into n segments in the vertical direction (N/n is a natural number). FIG. 11C shows an area to be transferred, which is obtained by adding neighboring pixels necessary for filtering to a segmented area.

The data transfer controlling unit 103 performs a control such that the process of generating a motion-compensated image is performed for m×n number of times on the segmented block shown in FIG. 11B, which has been segmented into m×n segments. Through the above process method, it is possible to reduce the least necessary capacity of the intermediate pixel storage memory 105 from $$\mathrm{MIN}(M \times (N+T-1), (M+T-1) \times N),$$

to $$\mathrm{MIN}(M/m \times (N/n+T-1), (M/m+T-1) \times N/n),$$

where MIN(A, B) denotes a function to return A or B, whichever has a smaller value.

Figure 14:
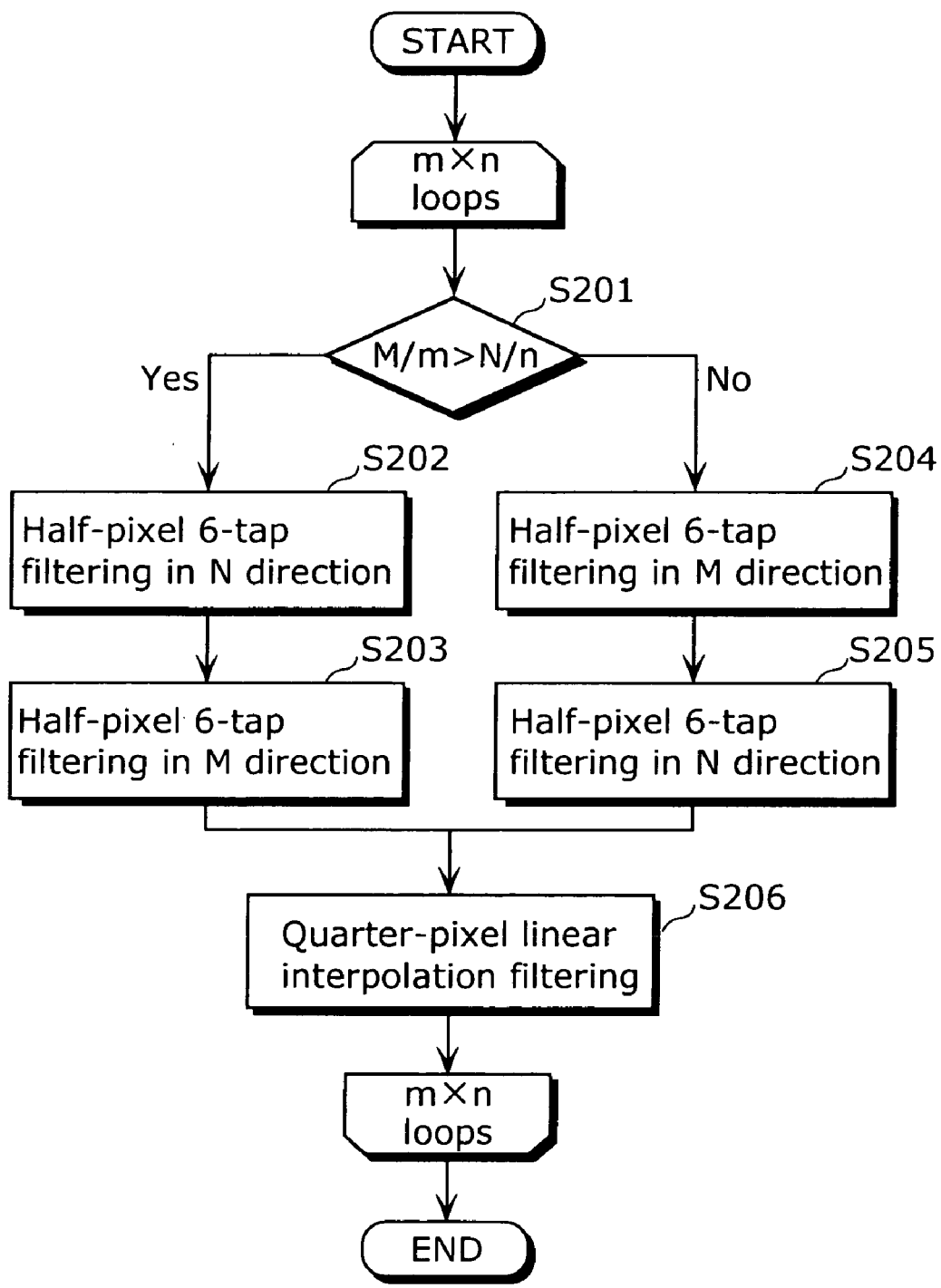
FIG. 14 is a flowchart showing the flow of operations for controlling data transfer performed by the data transfer controlling unit.

FIG. 14 is a flowchart showing the flow of operations for controlling data transfer performed by the data transfer controlling unit 103.

First, the data transfer controlling unit 103 compares M/m and N/n to determine whether M/m is greater than N/n (Step S201). In the case where the value of M/m is greater than that of N/n (YES in Step S201), 6-tap filtering is performed in the N direction (Step S202), and then 6-tap filtering is performed in the M direction (Step S203).

Meanwhile, in the case where the value of M/m is not greater than that of N/n (NO in Step S201), 6-tap filtering is performed in the M direction (Step S204), and then 6-tap filtering is performed in the N direction (Step S205).

Next, after performing filtering in each of the M direction and the N direction, quarter-pixel linear interpolation filtering is then performed (Step S206).

By performing the above process in m×n loops, motion-compensated images for the whole current block are generated.

Note that the H.264 standard specifies that T=6 and that the value of each of M and N is any of 16, 8, and 4. Thus, the value of each of m and n can be 2, 4, 8, 16, or the like.

As described above, since the data transfer controlling unit 103 performs data transfer such that filtering is performed on a segmented current block, it is possible to reduce the amount of data to be transferred from the multi frame memory 402 to the motion compensating apparatus 100, while allowing the intermediate pixel storage memory 105 to implement a reduced memory capacity.

(Fourth Embodiment)

The present embodiment describes the case of storing, into the intermediate pixel storage memory, pixel data of pixels at integer-pixel positions, in addition to storing intermediate pixel data.

Figure 15:
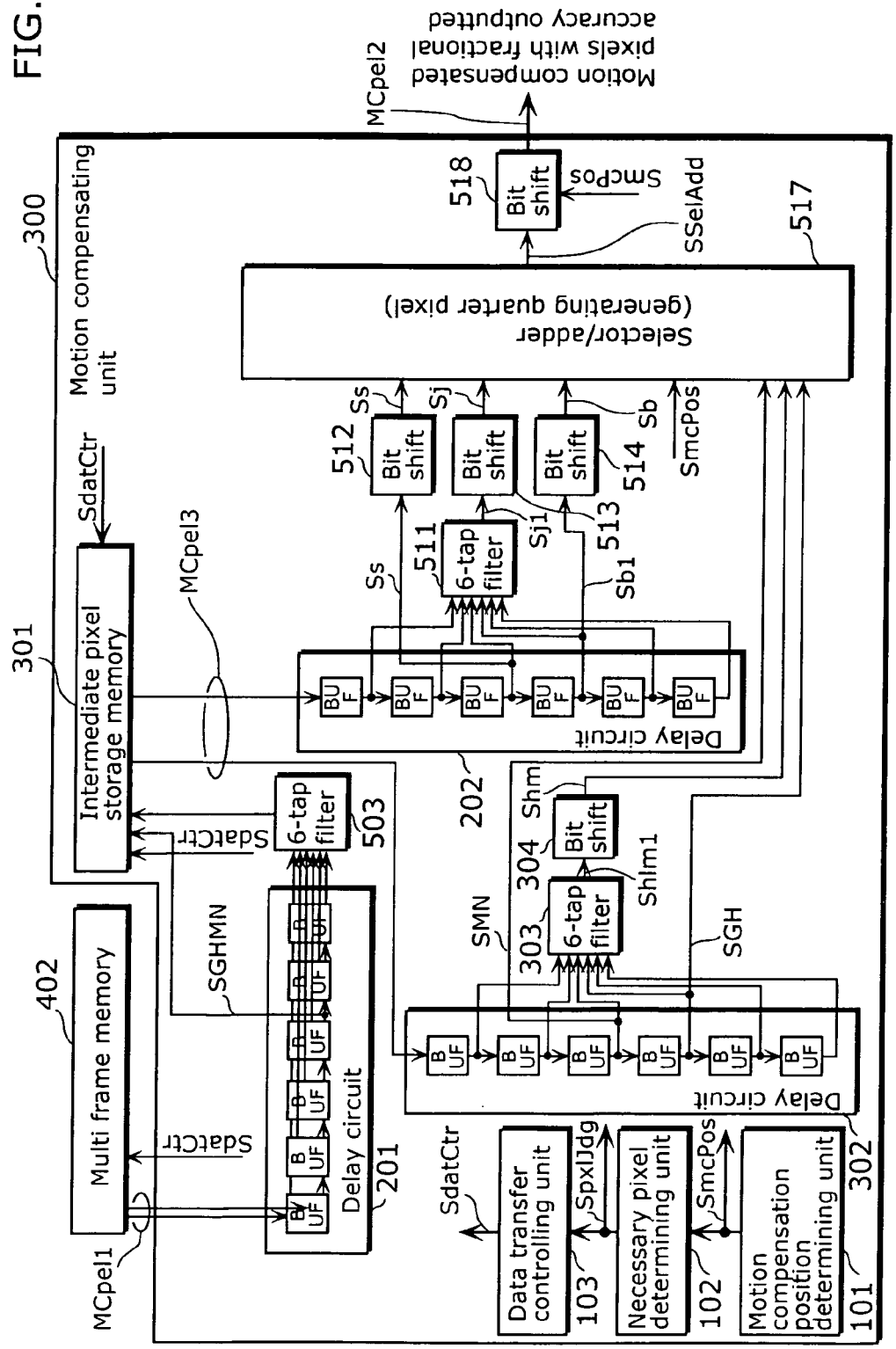
FIG. 15 is a block diagram showing the structure of a motion compensating apparatus (motion compensating unit) according to a fourth embodiment of the present invention.

FIG. 15 is a block diagram showing the structure of a motion compensating apparatus (motion compensating unit) according to the fourth embodiment of the present invention. Note that the same elements as those of the first embodiment shown in FIG. 6 are assigned the same reference numbers, and the descriptions thereof are not given here.

The motion compensating apparatus 300 of the fourth embodiment is newly added with a delay circuit 302, a 6-tap filter 303, and a bit shift 304, and does not include the pixel selecting unit 104 and the bit shift 205, compared with the first embodiment. Moreover, its intermediate pixel storage memory 301 has a bank structure.

If the intermediate pixel storage memory 301 can have a larger capacity, it is possible to further reduce the number of pixels to be transferred. Moreover, if the intermediate pixel storage memory 301 adopts a bank structure in the form of two-port memory or the like by which read and write are carried out independently, it is possible to achieve faster operations. Referring to FIG. 15, the following describes the operations.

Each pixel data MCpel1 transferred from the multi frame memory 402 is inputted only to the delay circuit 201. Delay data from the delay circuit 201 is inputted to the 6-tap filter 503, and the result of filtering is then inputted to the intermediate pixel storage memory 301.

Furthermore, the delay pixel from the fourth stage of the delay circuit 201 is outputted as a signal SGHMN, which is to be stored into the intermediate pixel storage memory 301 together with the result of filtering performed by the 6-tap filter 503. Respective pieces of pixel data stored in the intermediate pixel storage memory 301 are outputted as pixel data MCpel3, of which data applied with 6-tap filtering is inputted to the delay circuit 202 without passing through the pixel selecting unit 104, unlike the first embodiment. Meanwhile, the read value of data SGHMN, which is pixel data MCpel3 whose integer pixel has been delayed, is inputted to the delay circuit 302. The delay circuit 302 outputs a signal SMN with delay data from the third stage being data of the pixel M or the pixel N shown in FIG. 3 at an integer-pixel position, and outputs a signal SGH with delay data from the fourth stage being data of the pixel G or the pixel H shown in FIG. 3 at an integer pixel position.

The 6-tap filter 303, which has delayed signals from the delay circuit 302 as its inputs, performs 6-tap filtering on them, and outputs a signal Sh1$m$1 as the result of filtering for the pixel position of the pixel h or the pixel m shown in FIG. 3. The bit shift 304 has, as its input, the filtering result Sh1$m$1$s$, and outputs a signal Shm as interpolated pixel data of the pixel h or the pixel m shown in FIG. 3.

The selector/adder 305, which has Ss, Sj, Sb, SMN, Shm, and SGH as its inputs, selects and adds pixels where necessary, according to a motion compensation position determination signal SmcPos, and outputs the resultant as a signal SSelAdd. The bit shift 518, which has the signal SSelAdd as its input, performs a bit shift of it where necessary, according to the motion compensation position signal SmcPos, and outputs the resultant as a motion-compensated image Mcpel2.

Figure 16A:
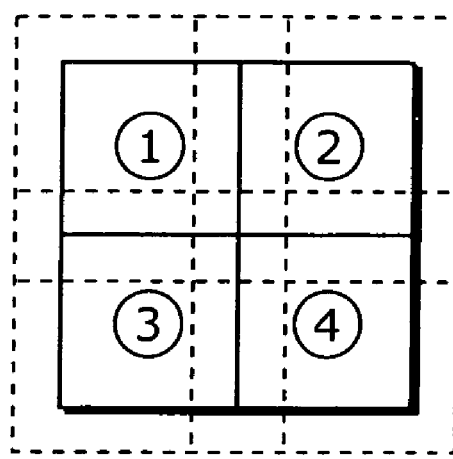
FIG. 16A is a diagram showing plural blocks for which motion-compensated images are generated.
Figure 16B:
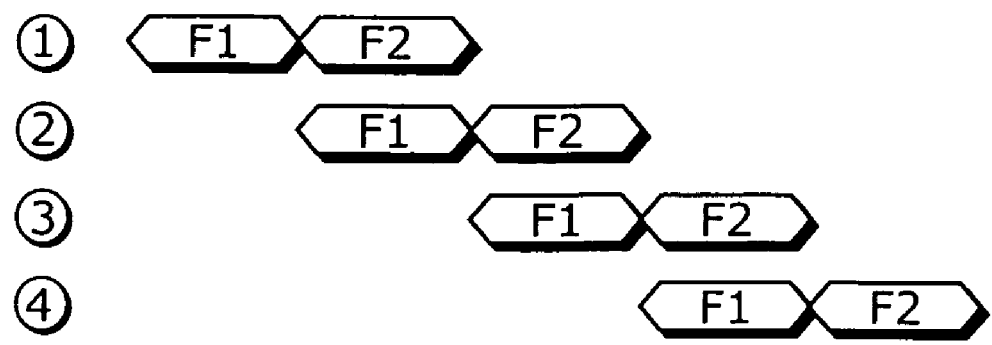
FIG. 16B is a diagram showing timing of performing filtering on each block in the horizontal and vertical directions.

Next, a description is given of the operations to be performed in the case where motion-compensated images of plural blocks are generated as shown in FIG. 16A. FIG. 16B is a diagram showing timing of performing filtering on each block in the horizontal and vertical directions. Note that blocks indicated by circled numbers 1 to 4 are processed in numerical order, and that horizontal filtering is performed first.

First, in the delay circuit 201 and the 6-tap filter 503, horizontal filtering is performed first on the block 1 (F1 for block 1).

Next, in the delay circuit 302 and the 6-tap filter 303, vertical filtering is performed on pixel data of each pixel at an integer-pixel poison in the block 1, and in the delay circuit 202 and the 6-tap filter 511, vertical filtering is performed on data, in the block 1, which has been processed by the 6-tap filter 503 (F2 for block 1). At the same time, in the delay circuit 201 and the 6-tap filter 503, horizontal filtering is simultaneously performed on the block 2 (F1 for block 2).

Next, in the delay circuit 302 and the 6-tap filter 303, vertical filtering is performed on pixel data of each pixel at an integer-pixel poison in the block 2, and in the delay circuit 202 and the 6-tap filter 511, vertical filtering is performed on data, in the block 2, which has been processed by the 6-tap filter 503 (F2 for block 2). At the same time, in the delay circuit 201 and the 6-tap filter 503, horizontal filtering is simultaneously performed on the block 3 (F1 for block 3). Hereafter, vertical filtering on the block 3 and horizontal filtering on the block 4 are simultaneously performed, as shown in FIG. 16B.

With the above structure, although the pixel capacity of the intermediate pixel storage memory 301 is increased compared with the first embodiment, the respective numbers of pixels to be transferred from the multi frame memory 402 to the motion compensating apparatus 300 in the case of transferring one 16×16 block, which is the maximum block, and transferring sixteen 4×4 block, which is the smallest block, are as represented by the following equations, respectively:

$$((16+5)\times(16+5)\times1 \text{ pixel width}\times1 \text{ block}=441 \quad (37),$$

and $$((4+5)\times(4+5)\times1 \text{ pixel width}\times16 \text{ blocks}=1{,}296 \quad (38).$$

Thus, from Equation 22, Equation 23, Equation 37, and Equation 38, the amount of data transfer can be reduced to 1/4.6 for the 16×16 block, and to 1/2.7 for the 4×4 blocks, as compared with conventional amount of data transfer.

Moreover, since pixel data of pixels at integer-pixel positions are stored in the intermediate pixel storage memory 301, in addition to intermediate pixel data, it is possible to perform in parallel vertical filtering and horizontal filtering which is performed on another block, and thus to improve processing speed.

(Fifth Embodiment)

Furthermore, if a program for realizing the motion compensating apparatus, the inter-picture predictive coding apparatus, or the inter-picture predictive decoding apparatus using such motion compensating apparatus as shown in each of the aforementioned embodiments is recorded on a recording medium such as a flexible disk, it becomes possible to easily perform the processes presented in the respective embodiments in an independent computer system.

Figure 17A:
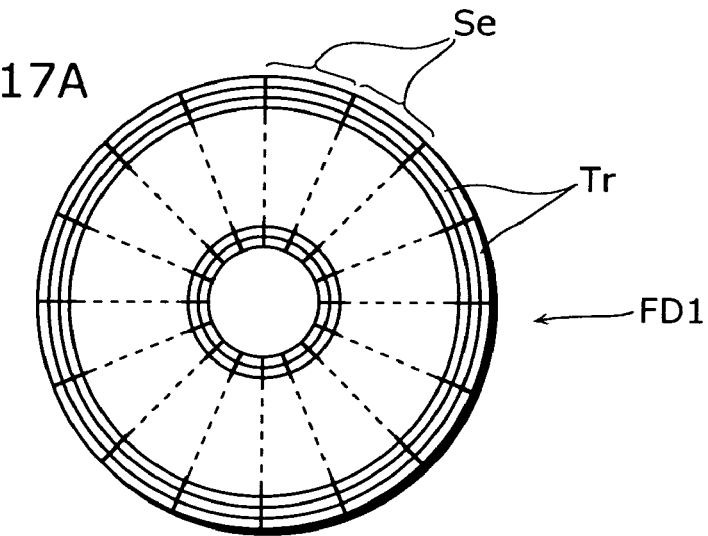
FIGS. 17A to 17C are diagrams illustrating a recording medium that stores a program for realizing, by a computer system, the motion compensating apparatus, the inter-picture predictive coding apparatus, or the inter-picture predictive decoding apparatus using such motion compensating apparatus described in each of the aforementioned embodiments, where
Figure 17B:
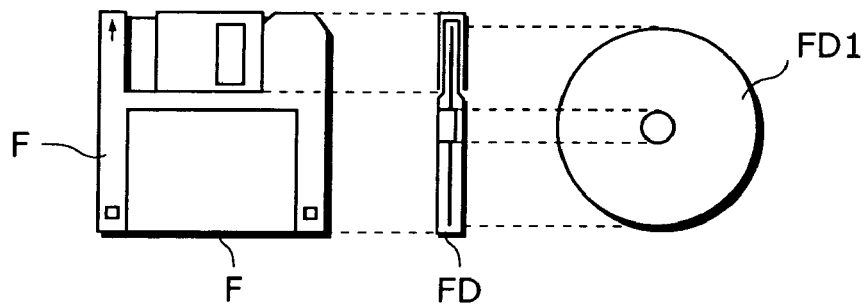
Figure 17C:
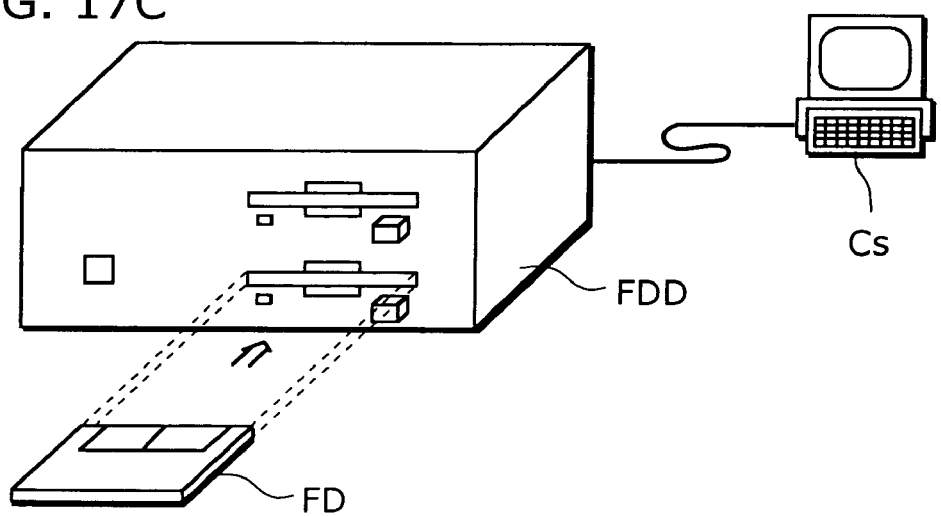

FIGS. 17A, 17B, and 17C are diagrams illustrating a flexible disk that stores a program for realizing the motion compensating apparatus, the inter-picture predictive coding apparatus, or the inter-picture predictive decoding apparatus using such motion compensating apparatus according to the aforementioned first to fourth embodiments.

FIG. 17B shows an external view of the flexible disk viewed from the front, its schematic cross-sectional view, and the flexible disk itself, while FIG. 17A illustrates an example physical format of the flexible disk as a recording medium itself. The flexible disk FD is contained in a case F, and a plurality of tracks Tr are formed concentrically on the surface of the flexible disk in the radius direction from the periphery, each track being divided into 16 sectors Se in the angular direction. Therefore, in the flexible disk storing the above-mentioned program, the motion compensating apparatus, the inter-picture predictive coding apparatus, or the inter-picture predictive decoding apparatus using such motion compensating apparatus as such program is recorded in an area allocated for it on the flexible disk FD.

Meanwhile, FIG. 17C shows the structure required for recording and reading out the program on and from the flexible disk FD. When the program realizing the above motion compensating apparatus, the inter-picture predictive coding apparatus, or the inter-picture predictive decoding apparatus using such motion compensating apparatus is to be recorded onto the flexible disk FD, such program shall be written by the use of the computer system Cs via a flexible disk drive. Meanwhile, when the motion compensating apparatus, the inter-picture predictive coding apparatus, or the inter-picture predictive decoding apparatus using such motion compensating apparatus is to be constructed in the computer system through the program on the flexible disk, the program shall be read out from the flexible disk via the flexible disk drive and then transferred to the computer system.

The above description is given on the assumption that a recording medium is the flexible disk, but an optical disc may also be used. In addition, the recording medium is not limited to this, and any other media such as an IC card and a ROM cassette capable of recording a program may also be used.

The following describes application examples of the motion compensating apparatus, the inter-picture predictive coding apparatus, or the inter-picture predictive decoding apparatus using such motion compensating apparatus as shown in each of the above embodiments as well as a system using the same.

Figure 18:
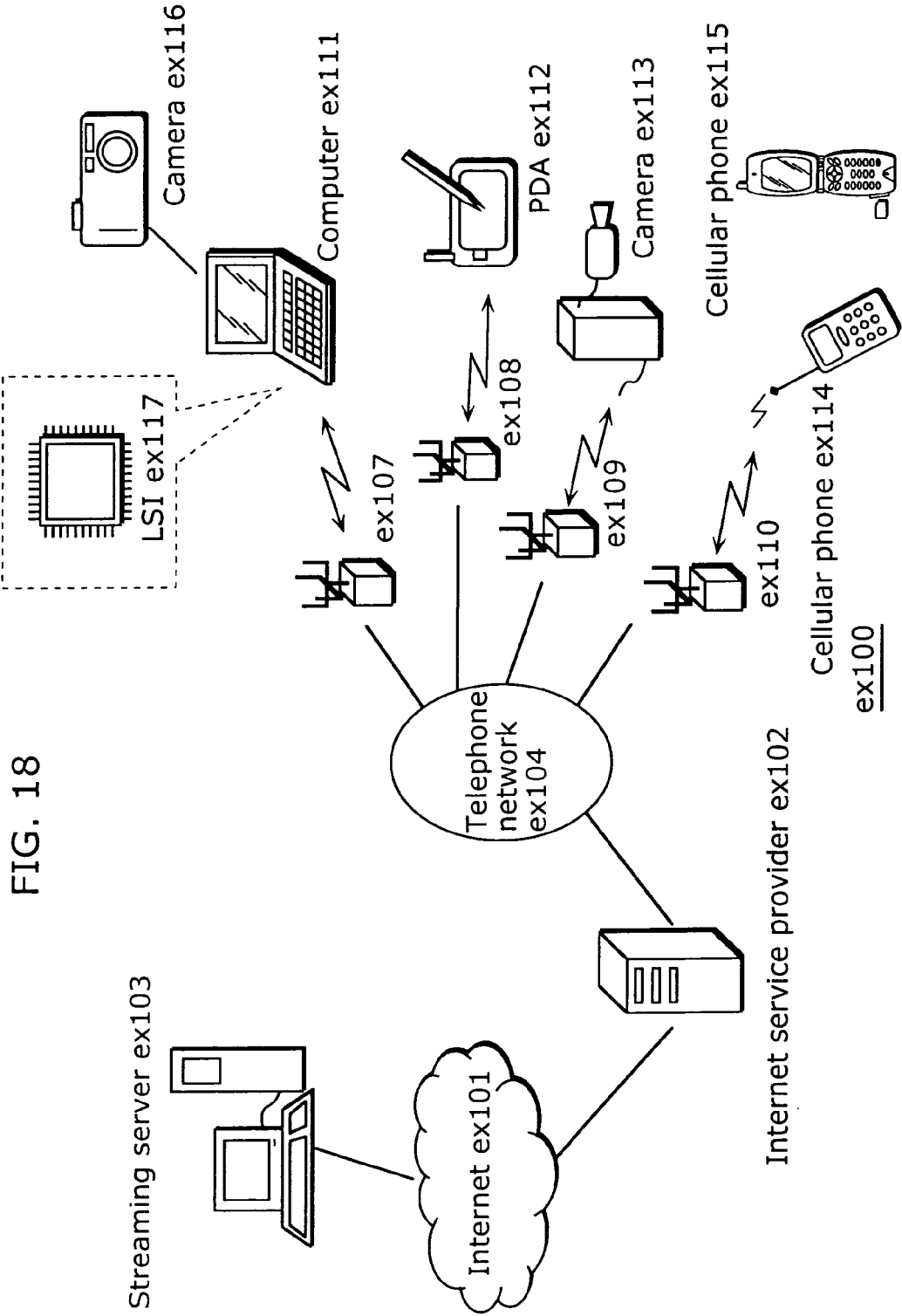
FIG. 18 is a block diagram showing an overall configuration of a content supply system that realizes a content distribution service.

FIG. 18 is a block diagram showing an overall configuration of a content supply system ex100 that realizes a content distribution service. The area for providing a communication service is divided into cells of desired size, and base stations ex107 to ex110, which are fixed wireless stations, are placed in the respective cells.

In this content supply system ex100, devices such as a computer ex111, a PDA (Personal Digital Assistant) ex112, a camera ex113, a cellular phone ex114, and a camera-equipped cellular phone ex115 are respectively connected to the Internet ex101 via an Internet service provider ex102, a telephone network ex104, and the base stations ex107 to ex110.

However, the content supply system ex100 is not limited to the combination as shown in FIG. 18, and may be connected to a combination of any of them. Also, each of the devices may be connected directly to the telephone network ex104, not via the base stations ex107 to ex110, which are fixed wireless stations.

The camera ex113 is a device such as a digital video camera capable of shooting moving pictures. The cellular phone may be a cellular phone of a PDC (Personal Digital Communication) system, a CDMA (Code Division Multiple Access) system, a W-CDMA (Wideband-Code Division Multiple Access) system, or a GSM (Global System for Mobile Communications) system, a PHS (Personal Handyphone system) or the like, and may be any one of these.

Furthermore, a streaming server ex103 is connected to the camera ex113 via the base station ex109 and the telephone network ex104, which enables live distribution or the like based on coded data transmitted by the user using the camera ex113. Either the camera ex113 or a server and the like capable of data transmission processing may code the shot data. Also, moving picture data shot by a camera ex116 may be transmitted to the streaming server ex103 via the computer ex111. The camera ex116 is a device such as a digital camera capable of shooting still pictures and moving pictures. In this case, either the camera ex116 or the computer ex111 may code the moving picture data. In this case, an LSI ex117 included in the computer ex111 or the camera ex116 performs coding processing. Note that software for inter-picture predictive coding/decoding may be integrated into a certain type of recording medium (such as a CD-ROM, a flexible disk and a hard disk) that is readable by the computer ex111 and the like. Furthermore, the camera-equipped cellular phone ex115 may transmit the moving picture data. This moving picture data is data coded by an LSI included in the cellular phone ex115.

In this content supply system ex100, content (e.g., a music live video) being shot by the user using the camera ex113, the camera ex116 or the like is coded in the same manner as the above-described embodiments and transmitted to the streaming server ex103, and the streaming server ex103 makes stream distribution of the content data to clients at their request. The clients here include the computer ex111, the PDA ex112, the camera ex113, the cellular phone ex114 and so forth capable of decoding the above coded data. The content supply system ex100 with the above structure is a system that enables the clients to receive and reproduce the coded data and realizes personal broadcasting by allowing them to receive, decode and reproduce the data in real time.

The inter-picture predictive coding apparatus and the inter-picture predictive decoding apparatus shown in the above embodiments can be used for coding and decoding to be performed in each of the devices making up the above system.

A cellular phone will be described as an example.

Figure 19:
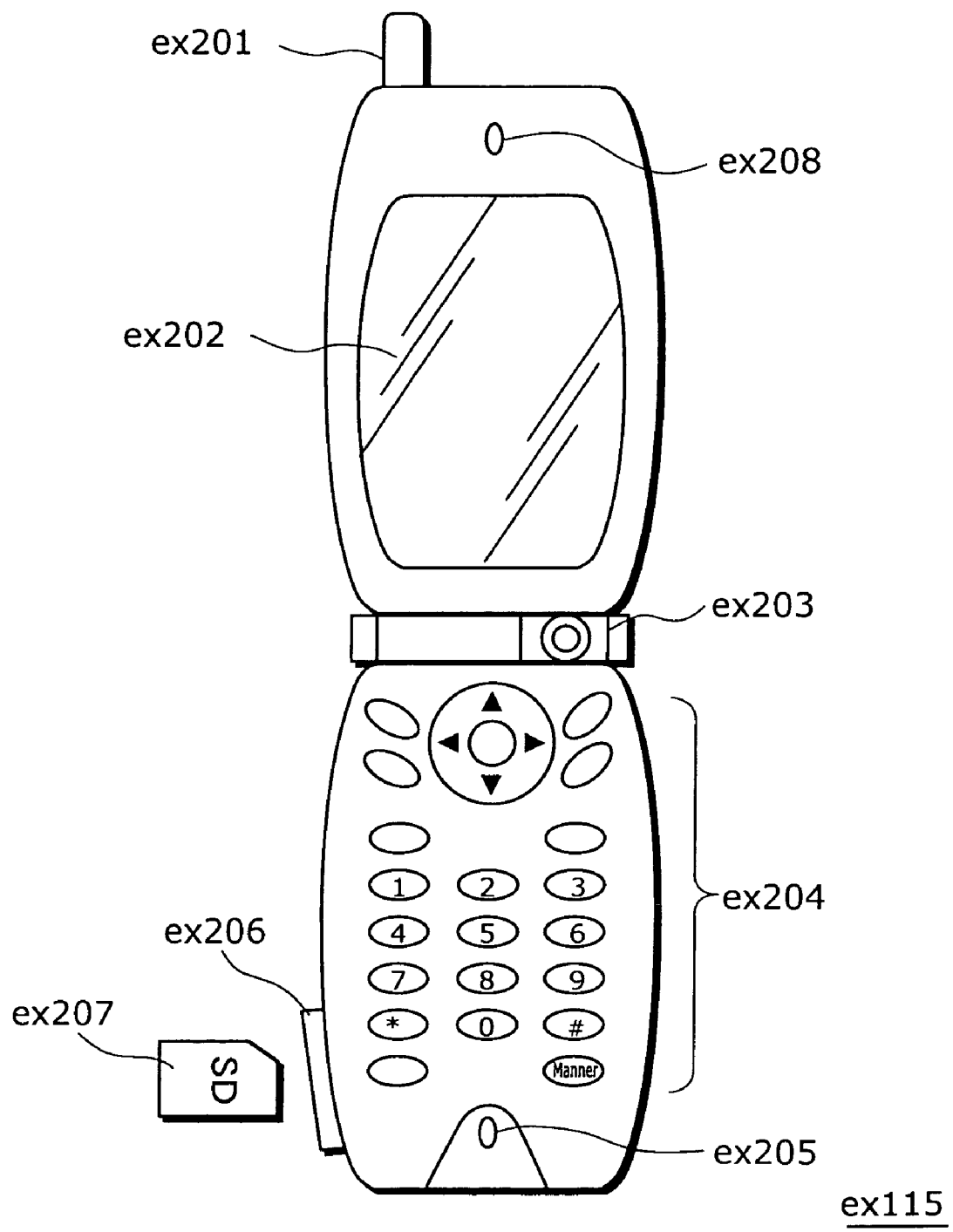
FIG. 19 is a schematic diagram showing an example of a cellular phone.

FIG. 19 is a diagram showing the cellular phone ex115 that employs the inter-picture predictive coding apparatus and the inter-picture predictive decoding apparatus described in the above embodiments. The cellular phone ex115 has an antenna ex201 for transmitting/receiving radio waves to and from the base station ex110, a camera unit ex203 such as a CCD camera capable of shooting video and still pictures, a display unit ex202 such as a liquid crystal display for displaying the data obtained by decoding video and the like shot by the camera unit ex203 and video and the like received by the antenna ex201, a main body equipped with a group of operation keys ex204, a voice output unit ex208 such as a speaker for outputting voices, a voice input unit ex205 such as a microphone for inputting voices, a recording medium ex207 for storing coded data or decoded data such as data of moving pictures or still pictures shot by the camera, data of received e-mails and moving picture data or still picture data, and a slot unit ex206 for enabling the recording medium ex207 to be attached to the cellular phone ex115. The recording medium ex207, whose example is an SD card, is formed by storing, in a plastic case, a flash memory element, which is a kind of EEPROM (Electrically Erasable and Programmable Read Only Memory) being an electrically erasable and rewritable nonvolatile memory.

Figure 20:
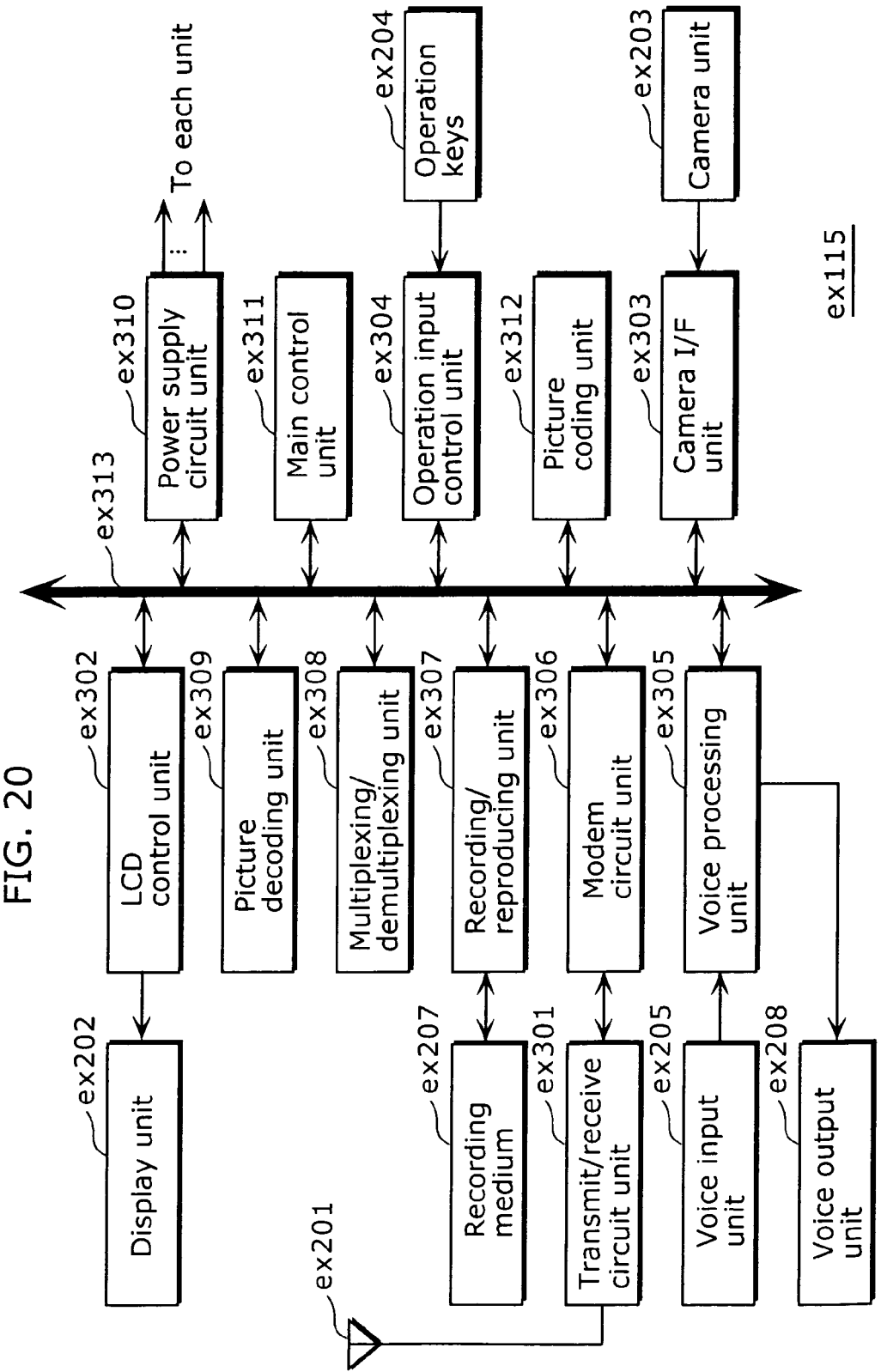
FIG. 20 is a block diagram showing an internal structure of the cellular phone.

Next, referring to FIG. 20, a description is given of the cellular phone ex115. In the cellular phone ex115, a main control unit ex311 for centrally controlling the display unit ex202 and each unit of the main body having the operation keys ex204 is configured in a manner in which a power supply circuit unit ex310, an operation input control unit ex304, a picture coding unit ex312, a camera interface unit ex303, an LCD (Liquid Crystal Display) control unit ex302, a picture decoding unit ex309, a multiplexing/demultiplexing unit ex308, a recording/reproducing unit ex307, a modem circuit unit ex306, and a voice processing unit ex305 are interconnected via a synchronous bus ex313.

When a call-end key or a power key is turned on by a user operation, the power supply circuit unit ex310 supplies each unit with power from a battery pack, and activates the camera-equipped digital cellular phone ex115 to make it into a ready state.

In the cellular phone ex115, the voice processing unit ex305 converts a voice signal collected by the voice input unit ex205 in conversation mode into digital voice data under the control of the main control unit ex311 comprised of a CPU, a ROM, a RAM and others, the modem circuit unit ex306 performs spread spectrum processing on it, and a transmit/receive circuit unit ex301 performs digital-to-analog conversion processing and frequency transformation processing on the data, so as to transmit the resultant via the antenna ex201. Also, in the cellular phone ex115, data received by the antenna ex201 in conversation mode is amplified and performed of frequency transformation processing and analog-to-digital conversion processing, the modem circuit unit ex306 performs inverse spread spectrum processing on the resultant, and the voice processing unit ex305 converts it into analog voice data, so as to output it via the voice output unit ex208.

Furthermore, when sending an e-mail in data communication mode, text data of the e-mail inputted by operating the operation keys ex204 on the main body is sent out to the main control unit ex311 via the operation input control unit ex304. In the main control unit ex311, after the modem circuit unit ex306 performs spread spectrum processing on the text data and the transmit/receive circuit unit ex301 performs digital-to-analog conversion processing and frequency transformation processing on it, the resultant is transmitted to the base station ex110 via the antenna ex201.

When picture data is transmitted in data communication mode, the picture data shot by the camera unit ex203 is supplied to the picture coding unit ex312 via the camera interface unit ex303. When picture data is not to be transmitted, it is also possible to display such picture data shot by the camera unit ex203 directly on the display unit ex202 via the camera interface unit ex303 and the LCD control unit ex302.

The picture coding unit ex312, which includes the inter-picture predictive coding apparatus according to the present invention, performs compression coding on the picture data supplied from the camera unit ex203 using the coding method employed by the inter-picture predictive coding apparatus presented in the above embodiments, so as to convert it into coded picture data, and sends it out to the multiplexing/demultiplexing unit ex308. At this time, the cellular phone ex115 sends voices collected by the voice input unit ex205 while the shooting by the camera unit ex203 is taking place, to the multiplexing/demultiplexing unit ex308 as digital voice data via the voice processing unit ex305.

The multiplexing/demultiplexing unit ex308 multiplexes the coded picture data supplied from the picture coding unit ex312 and the voice data supplied from the voice processing unit ex305 using a predetermined method, the modem circuit unit ex306 performs spread spectrum processing on the resulting multiplexed data, and the transmit/receive circuit unit ex301 performs digital-to-analog conversion processing and frequency transformation processing on the resultant, so as to transmit the processed data via the antenna ex201.

When receiving, in data communication mode, moving picture file data which is linked to a Web page or the like, the modem circuit unit ex306 performs inverse spread spectrum processing on the received signal received from the base station ex110 via the antenna ex201, and sends out the resulting multiplexed data to the multiplexing/demultiplexing unit ex308.

In order to decode the multiplexed data received via the antenna ex201, the multiplexing/demultiplexing unit ex308 separates the multiplexed data into a coded bitstream of picture data and a coded bitstream of voice data, and supplies such coded picture data to the picture decoding unit ex309 and such voice data to the voice processing unit ex305 via the synchronous bus ex313.

Next, the picture decoding unit ex309, which includes the inter-picture predictive decoding apparatus according to the present invention, decodes the coded bitstream of the picture data using the decoding method paired with the coding method shown in the above-mentioned embodiments so as to generate moving picture data for reproduction, and supplies such data to the display unit ex202 via the LCD control unit ex302. Accordingly, moving picture data included in the moving picture file linked to a Web page, for instance, is displayed. At the same time, the voice processing unit ex305 converts the voice data into an analog voice signal, and then supplies this to the voice output unit ex208. Accordingly, voice data included in the moving picture file linked to a Web page, for instance, is reproduced.

Figure 21:
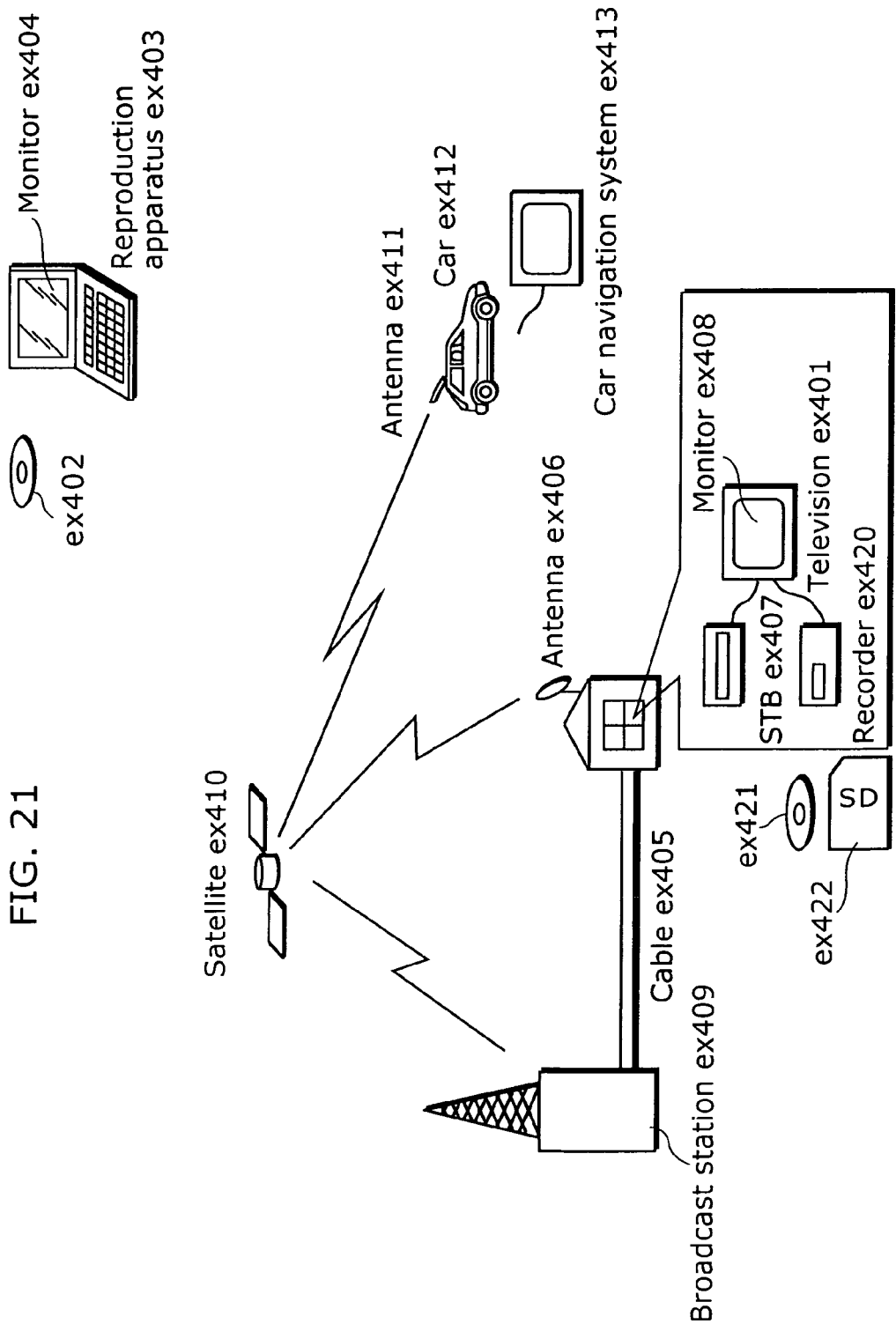
FIG. 21 is a block diagram showing an overall structure of a digital broadcasting system.

Note that the aforementioned system is not an exclusive example and therefore that at least either the inter-picture predictive coding apparatus or the inter-picture predictive decoding apparatus of the above embodiments can be incorporated into a digital broadcasting system as shown in FIG. 21, against the backdrop that satellite/terrestrial digital broadcasting has been a recent topic of conversation. To be more specific, at a broadcasting station ex409, a bitstream of video information is transmitted, by radio waves, to a satellite ex410 for communications or broadcasting. Upon receipt of it, the broadcast satellite ex410 transmits radio waves for broadcasting, an antenna ex406 of a house equipped with satellite broadcasting reception facilities receives such radio waves, and an apparatus such as a television (receiver) ex401 and a set top box (STP) ex407 decodes the bitstream and reproduces the decoded data. The inter-picture predictive decoding apparatus as shown in the above-mentioned embodiments can be implemented in the reproduction apparatus ex403 for reading and decoding the bitstream recorded on a storage medium ex402, which is a recording medium such as a CD and a DVD. In this case, a reproduced video signal is displayed on a monitor ex404. It is also conceivable that the inter-picture predictive decoding apparatus is implemented in the set top box ex407 connected to a cable ex405 for cable television or the antenna ex406 for satellite/terrestrial broadcasting so as to reproduce it on a television monitor ex408. In this case, the inter-picture predictive decoding apparatus may be incorporated into the television, not in the set top box. Alternatively, a car ex412 with an antenna ex411 can receive a signal from the satellite ex410, the base station ex107 or the like, so as to reproduce a moving picture on a display device such as a car navigation system ex413 mounted on the car ex412.

Furthermore, it is also possible to code a picture signal by the inter-picture predictive coding apparatus presented in the above embodiments and to record the resultant in a recording medium. Examples include a DVD recorder for recording a picture signal on a DVD disc ex421 and a recorder ex420 such as a disc recorder for recording a picture signal on a hard disk. Moreover, a picture signal can also be recorded in an SD card ex422. If the recorder ex420 is equipped with the inter-picture predictive decoding apparatus presented in the above embodiments, it is possible to reproduce a picture signal recorded on the DVD disc ex421 or in the SD card ex422, and display it on the monitor ex408.

As the configuration of the car navigation system ex413, the configuration without the camera unit ex203 and the camera interface unit ex303, out of the configuration shown in FIG. 20, is conceivable. The same is applicable to the computer ex111, the television (receiver) ex401 and the like.

Concerning the terminals such as the cellular phone ex114, a transmitting/receiving terminal having both an encoder and a decoder, as well as a transmitting terminal only with an encoder, and a receiving terminal only with a decoder are possible as forms of implementation.

As stated above, it is possible to employ the inter-picture predictive coding apparatus or the inter-picture predictive decoding apparatus presented in the above embodiments into any one of the above-described devices and systems. Accordingly, it becomes possible to achieve an effect described in the aforementioned embodiments.

The present invention is not limited to the above embodiments and encompasses all possible variations which could be made without departing from its scope and its spirit.

Note that each function block in the block diagram shown in FIGS. 5, 6, and 15 can be realized typically as an LSI that is an integrated circuit. Such LSI may be incorporated in one or plural chip form (e.g., function blocks other than memory may be incorporated into a single chip). Here, LSI is taken as an example, but, it can be referred to as IC, system LSI, super LSI and ultra LSI depending on the integration degree.

The method of incorporating the functional blocks into an integrated circuit is not limited to the LSI, and it may be realized with a private line or a general processor. After manufacturing of LSI, a Field Programmable Gate Array (FPGA) that is programmable or a reconfigurable processor whose LSI allows reconfiguration of connection and setting of a circuit cell, may be utilized.

Furthermore, along with the arrival of technique for incorporating the function blocks into an integrated circuit that replaces the LSI owing to a progress in semiconductor technology or another technique that has deviated from it, integration of the function blocks may be carried out using the newly-arrived technology. Bio-technology may be cited as one of the examples.

Out of the function blocks, only a unit, such as the multi frame memory 402, which stores data to be used as reference to at the time of coding or decoding, may be constructed separately without being incorporated in a chip form. In this case, it is possible to provide, between the multi frame memory 402 and the delay circuit 201, a buffer memory for temporarily storing data to be filtered before it is being filtered.

Industrial Applicability

The motion compensating apparatus, the inter-picture predictive coding apparatus, and the inter-picture predictive decoding apparatus of the present invention is suited to efficiently generate a motion-compensated pixel, generate a coded stream by coding each picture making up a moving picture, decode the generated coded stream, and others in, for example, a content distribution apparatus, a digital broadcasting apparatus, a cellular phone, a DVD apparatus, a personal computer, and the like.

The invention claimed is:

1. A motion compensating apparatus that performs motion-compensated prediction with fractional-pixel accuracy between pictures that constitute a moving picture, said apparatus comprising:
a high-order tap filtering circuit configured to generate pieces of pixel data with half-pixel accuracy used for motion-compensated prediction, by successively performing filtering operations in a predetermined direction on pieces of reference pixel data to be transferred thereto, the pieces of reference pixel data being included in each block;
an intermediate output pixel memory configured to store the pieces of pixel data with half-pixel accuracy generated by said high-order tap filtering circuit; and
a data transfer controlling unit configured to control transfer of the pieces of reference pixel data,
wherein said high-order tap filtering circuit is configured to generate pieces of pixel data with half-pixel accuracy by successively performing, on pieces of pixel data with half-pixel accuracy inputted from said intermediate output pixel memory, filtering operations in a direction orthogonal to the predetermined direction,
said data transfer controlling unit is configured to compare the number of pixels in a horizontal direction and the number of pixels in a vertical direction in the current block to be processed, and to transfer, to said high-order tap filtering circuit, the pieces of reference pixel data used for the current block to be processed in the direction in which a smaller number of pixels are arranged,
the current block to be processed is made up of horizontal M pixels×vertical N pixels, where M and N are positive integers, and
said data transfer controlling unit is configured to:
compare the horizontal M pixels and the vertical N pixels;
transfer the pieces of reference pixel data used for the current block to be processed to said high-order tap filtering circuit in the vertical direction, and then transfer ones of the pieces of reference pixel data used for the current block to be processed to said high-order tap filtering circuit in the horizontal direction, in the case where N is smaller than M; and
transfer the pieces of reference pixel data used for the current block to be processed to said high-order tap filtering circuit in the horizontal direction, and then transfer ones of the pieces of the reference pixel data used for the current block to be processed to said high-order tap filtering circuit in the vertical direction, in the case where M is smaller than N.

2. The motion compensating apparatus according to claim 1,
wherein said high-order tap filtering circuit includes:
a first delay unit configured to sequentially store the pieces of reference pixel data necessary for processing performed by said high-order tap filtering circuit;
a first high-order tap filtering circuit configured to generate the pieces of pixel-data with half pixel accuracy by successively performing the filtering operations in the predetermined direction on the pieces of reference pixel data, the filtering operations being performed, using the pieces of reference pixel data stored in said first delay unit, for the number of times that is equivalent to the number of rows or columns in a current block to be processed;
a second delay unit configured to sequentially store the pieces of pixel data with half-pixel accuracy inputted from said intermediate output pixel memory; and
a second high-order tap filtering circuit configured to generate the pieces of pixel data with half-pixel accuracy by successively performing, on the pieces of pixel data with half-pixel accuracy inputted from said second delay unit or the pieces of reference pixel data, the filtering operations in the direction orthogonal to the direction in which said first high-order tap filtering circuit performs the operations, the filtering operations being performed for the number of times that is equivalent to the number of rows or columns in the current block to be processed.

3. The motion compensating apparatus according to claim 2, further comprising:
a second pixel selecting unit configured to select one of the following, based on a position of pixels to be motion compensated: the pieces of reference pixel data; the pieces of pixel data with half-pixel accuracy inputted from said intermediate output pixel memory; the pieces of pixel data with half-pixel accuracy inputted from said first high-order tap filtering circuit; and the pieces of pixel data with half-pixel accuracy inputted from said second high-order tap filtering-unit circuit; and
a linear interpolation calculating unit configured to perform linear interpolation between the pieces of pixel data selected by said second pixel selecting unit, and to generate and output pixel data with motion compensation accuracy of less than half-pixel accuracy.

4. The motion compensating apparatus according to claim 2, further comprising a first pixel selecting unit configured to select, based on the control performed by said data transfer controlling unit, the pieces of pixel data with half-pixel accuracy inputted from said intermediate output pixel memory or the pieces of reference pixel data, and to output the selected pieces of data to at least one of said first high-order tap filtering circuit and said second high-order tap filtering circuit.

5. The motion compensating apparatus according to claim 2, wherein said first high-order tap filtering circuit and said second high-order tap filtering circuit are constructed using a common operation resource, and are configured to support a bit accuracy of the pieces of pixel data with half-pixel accuracy.

6. The motion compensating apparatus according to claim 2, wherein said first high-order tap filtering circuit is configured to perform a single filtering process or a plurality of simultaneous parallel filtering processes, said second high-order tap filtering circuit is configured to perform a single filtering process or a plurality of simultaneous parallel filtering processes, and the width of a bus through which data is inputted to said motion compensating apparatus is equal to or greater than a sum of the number of pixels on which said first high-order tap filtering circuit performs the simultaneous parallel processes and the number of pixels on which said second high-order tap filtering circuit performs the simultaneous processes.

7. The motion compensating apparatus according to claim 2, wherein said second high-order tap filtering circuit is configured to support a bit accuracy of the pieces of pixel data with half-pixel accuracy.

8. The motion compensating apparatus according to claim 2, wherein said intermediate output pixel memory is configured to store the pieces of reference pixel data, together with the pieces of pixel data with half-pixel accuracy generated by said first high-order tap filtering circuit, and to simultaneously perform data reading and writing, said second high-order tap filtering circuit is configured to perform the filtering operations on pieces of reference pixel data and pieces of pixel data with half-pixel accuracy inputted from said intermediate output pixel memory, and said first high-order tap filtering circuit and said second high-order tap filtering circuit are configured to perform the operations in a pipelined manner.

9. The motion compensating apparatus according to claim 1, wherein said high-order tap filtering circuit is configured to:

perform T-tap filtering operations, where T denotes the number of taps;

generate the pieces of pixel data with half-pixel accuracy equivalent to $(M+T-1) \times N$ pixels by successively performing, on the N pixels in the pieces of transferred reference pixel data, the filtering operations in the vertical direction for $(M+T-1)$ number of times, and then generate the pieces of pixel data with half-pixel accuracy by successively performing the filtering operations in the horizontal direction on ones of the pieces of transferred reference pixel data, in the case where N is smaller than M; and generate the pieces of pixel data with half-pixel accuracy equivalent to $(N+T-1) \times M$ pixels by successively performing, on the M pixels in the pieces of transferred reference pixel data, the filtering operations in the horizontal direction for $(N+T-1)$ number of times, and then generate the pieces of pixel data with half-pixel accuracy by successively performing the filtering operations in the vertical direction on ones of the pieces of transferred reference pixel data, in the case where M is smaller than N.

10. The motion compensating apparatus according to claim 9, wherein a capacity of said intermediate output pixel memory is at least one of $(M+T-1) \times N$ and $M \times (N+T-1)$, whichever is smaller.

11. The motion compensating apparatus according to claim 1, wherein said data transfer controlling unit is configured to segment the current block to be processed into a predetermined number of sub-blocks, and to transfer the pieces of reference pixel data used for the current block to be processed to said high-order tap filtering circuit on a sub-block basis.

12. The motion compensating apparatus according to claim 11, wherein the current block to be processed is made up of horizontal M pixels×vertical N pixels, where M and N are positive integers, said data transfer controlling unit is configured to:

segment the current block to be processed into the m×n sub-blocks by segmenting the M pixels into m-equal segments and segmenting the N pixels into n-equal segments, and compare M/m and N/n, where m and n are positive integers that allow M/m and N/n to be integers, respectively;

transfer, on a sub-block basis, the pieces of reference pixel data used for the current block to be processed to said high-order tap filtering circuit in the vertical direction, and then transfer, on a sub-block basis, ones of the pieces of reference pixel data used for the current block to be processed to said high-order tap filtering circuit in the horizontal direction, in the case where N/n is smaller than M/m; and transfer, on a sub-block basis, the pieces of reference pixel data used for the current block to be processed to said high-order tap filtering circuit in the horizontal direction, and then transfer, on a sub-block basis, ones of the pieces of the reference pixel data used for the current block to be processed to said high-order tap filtering circuit in the vertical direction, in the case where M/m is smaller than N/n.

13. The motion compensating apparatus according to claim 12, wherein said high-order tap filtering circuit is configured to:

perform T-tap filtering operations, where T denotes the number of taps;

generate the pieces of pixel data with half-pixel accuracy equivalent to $(M/m+T-1) \times N/n$ pixels by successively performing, on the N/n pixels in the pieces of transferred reference pixel data, the filtering operations in the vertical direction for $(M/m+T-1)$ number of times, and then generate the pieces of pixel data with half-pixel accuracy by successively performing the filtering operations in the horizontal direction on ones of the pieces of transferred reference pixel data, in the case where N/n is smaller than M/m; and generate the pieces of pixel data with half-pixel accuracy equivalent to (N/n+T−1)×M/m pixels by successively performing, on the M/m pixels in the pieces of transferred reference pixel data, the filtering operations in the horizontal direction for (N/n+T−1) number of times, and then generate the pieces of pixel data with half-pixel accuracy by successively performing the filtering operations in the vertical direction on ones of the pieces of transferred reference pixel data, in the case where M/m is smaller than N/n; and perform the filtering operations on a sub-block basis in a time division manner.

14. The motion compensating apparatus according to claim 13, wherein a capacity of said intermediate output pixel memory is at least one of (M/m+T−1)×N/n and M/m× (N/n+T−1), whichever is smaller.

15. The motion compensating apparatus according to claim 1, wherein said intermediate output pixel memory is further configured to store the pieces of reference pixel data necessary for processing performed by said high-order tap filtering circuit.

16. An inter-picture predictive coding apparatus that codes a moving picture by performing motion-compensated prediction with fractional-pixel accuracy, said apparatus comprising:

said motion compensating apparatus according to claim 1; and a coding unit configured to code pixel data in the moving picture, based on pixel data obtained through the motion-compensated prediction performed by said motion compensating apparatus.

17. An inter-picture predictive decoding apparatus that decodes a moving picture by performing motion-compensated prediction with fractional-pixel accuracy, said apparatus comprising:

said motion compensating apparatus according to claim 1; and a decoding unit configured to decode pixel data in the moving picture, based on pixel data obtained through the motion-compensated prediction performed by said motion compensating apparatus.

18. A motion compensating method for performing motion-compensated prediction with fractional-pixel accuracy between pictures that constitute a moving picture, said method comprising:

a high-order tap filtering step of generating pieces of pixel data with half-pixel accuracy, by successively performing filtering operations in a predetermined direction on pieces of reference pixel data to be transferred, the pieces of reference pixel data being included in each block;

an intermediate output pixel storing step of storing, into an intermediate output pixel memory, the pieces of pixel data with half-pixel accuracy generated in said high-order tap filtering step; and a data transfer controlling step of controlling transfer of the pieces of reference pixel data, wherein in said high-order tap filtering step, pieces of pixel data with half-pixel accuracy is generated by successively performing, on pieces of pixel data with half-pixel accuracy inputted from said intermediate output pixel memory, filtering operations in a direction orthogonal to the predetermined direction, in said data transfer controlling step, the number of pixels in a horizontal direction is compared with the number of pixels in a vertical direction in the current block to be processed, and the pieces of reference pixel data used for the current block to be processed in the direction in which a smaller number of pixels are arranged are transferred to be used in said high-order tap filtering step, the current block to be processed is made up of horizontal M pixels×vertical N pixels, where M and N are positive integers, and in said data transfer controlling step:

the horizontal M pixels are compared with the vertical N pixels;

the pieces of reference pixel data used for the current block to be processed are transferred in the vertical direction to be used in said high-order tap filtering step, and then ones of the pieces of reference pixel data used for the current block to be processed are transferred in the horizontal direction to be used in said high-order tap filtering step, in the case where N is smaller than M; and the pieces of reference pixel data used for the current block to be processed are transferred in the horizontal direction to be used in said high-order tap filtering step, and then ones of the pieces of the reference pixel data used for the current block to be processed are transferred in the vertical direction to be used in said high-order tap filtering step, in the case where M is smaller than N.

* * * * *